United States Patent
Hosaka et al.

(10) Patent No.: US 9,940,966 B2
(45) Date of Patent: Apr. 10, 2018

(54) OPTICAL INFORMATION REPRODUCTION DEVICE AND OPTICAL INFORMATION REPRODUCTION METHOD

(71) Applicant: Hitachi Consumer Electronics Co., Ltd., Yokohama-shi, Kanagawa (JP)

(72) Inventors: Makoto Hosaka, Tokyo (JP); Shinji Fujita, Tokyo (JP)

(73) Assignee: Hitachi Consumer Electronics Co., Ltd., Yokohama-shi (JP)

( * ) Notice: Subject to any disclaimer, the term of this patent is extended or adjusted under 35 U.S.C. 154(b) by 0 days.

(21) Appl. No.: 15/101,239

(22) PCT Filed: Dec. 4, 2013

(86) PCT No.: PCT/JP2013/082523
§ 371 (c)(1),
(2) Date: Jun. 2, 2016

(87) PCT Pub. No.: WO2015/083246
PCT Pub. Date: Jun. 11, 2015

(65) Prior Publication Data
US 2016/0307591 A1    Oct. 20, 2016

(51) Int. Cl.
*G11B 7/0065* (2006.01)
*G11B 7/1353* (2012.01)
(Continued)

(52) U.S. Cl.
CPC ............ *G11B 7/1353* (2013.01); *G03H 1/26* (2013.01); *G11B 7/005* (2013.01); *G11B 7/0065* (2013.01); *G11B 7/1374* (2013.01); *G11B 7/1381* (2013.01)

(58) Field of Classification Search
None
See application file for complete search history.

(56) References Cited

U.S. PATENT DOCUMENTS

2009/0316559 A1* 12/2009 Nakamura ........... G11B 7/0065
369/103

FOREIGN PATENT DOCUMENTS

JP    5-290404 A    11/1993
JP    2006-194969 A    7/2006
(Continued)

OTHER PUBLICATIONS

International Search Report (PCT/ISA/210) issued in PCT Application No. PCT/JP2013/082523 dated Jan. 28, 2014 with English-language translation (four (4) pages).

*Primary Examiner* — Brian Butcher
(74) *Attorney, Agent, or Firm* — Crowell & Moring LLP

(57) ABSTRACT

Provided are an optical information reproduction device and a method therefor with which the influence of reference light reflected from the surface of a disk can be reduced, thereby enabling data to be reproduced in a stable manner in an optical information reproduction device that uses holography. The information reproduction device, which reproduces from a recording medium information that has been recorded on the recording medium by the formation of a hologram, is equipped with: a light output unit that emits laser light; an optical system that generates reference light from the laser light emitted from the light output unit; an objective lens that reproduction signal light reproduced by the reference light with which the recording medium has been irradiated enters; a light detector that receives the reproduction signal light propagated by the objective lens; a medium-reflected light reduction unit that reduces the amount of medium-reflected light (generated when the recording medium reflects the reference light) with which the light detector is irradiated; and a control unit that controls the operation of the information reproduction device.

10 Claims, 19 Drawing Sheets

(51) Int. Cl.
*G03H 1/26* (2006.01)
*G11B 7/005* (2006.01)
*G11B 7/1381* (2012.01)
*G11B 7/1374* (2012.01)

(56) References Cited

FOREIGN PATENT DOCUMENTS

| | | |
|---|---|---|
| JP | 2009-294512 A | 12/2009 |
| JP | 2010-2575 A | 1/2010 |
| JP | 2010-9690 A | 1/2010 |
| WO | WO 2011/013172 A1 | 2/2011 |

* cited by examiner

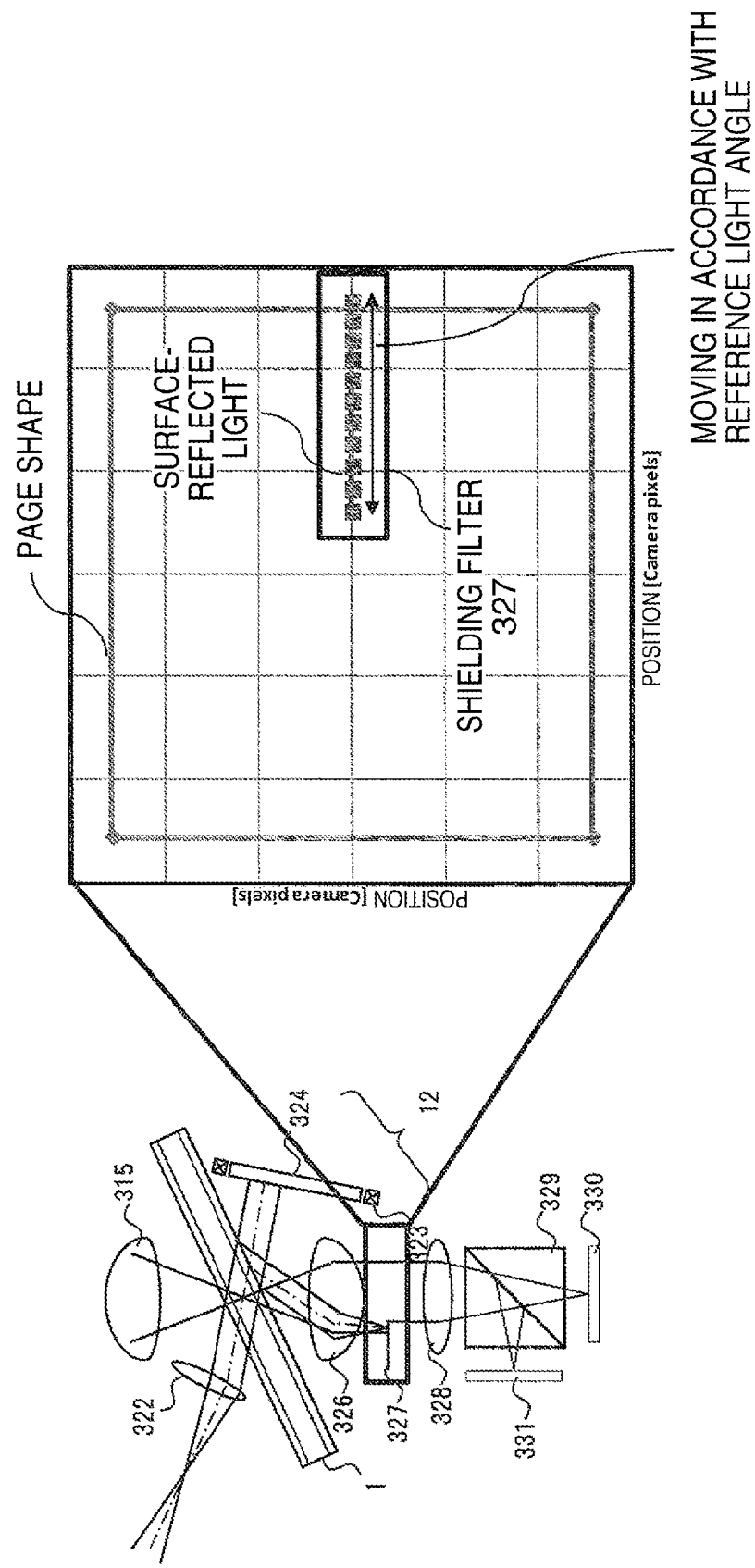

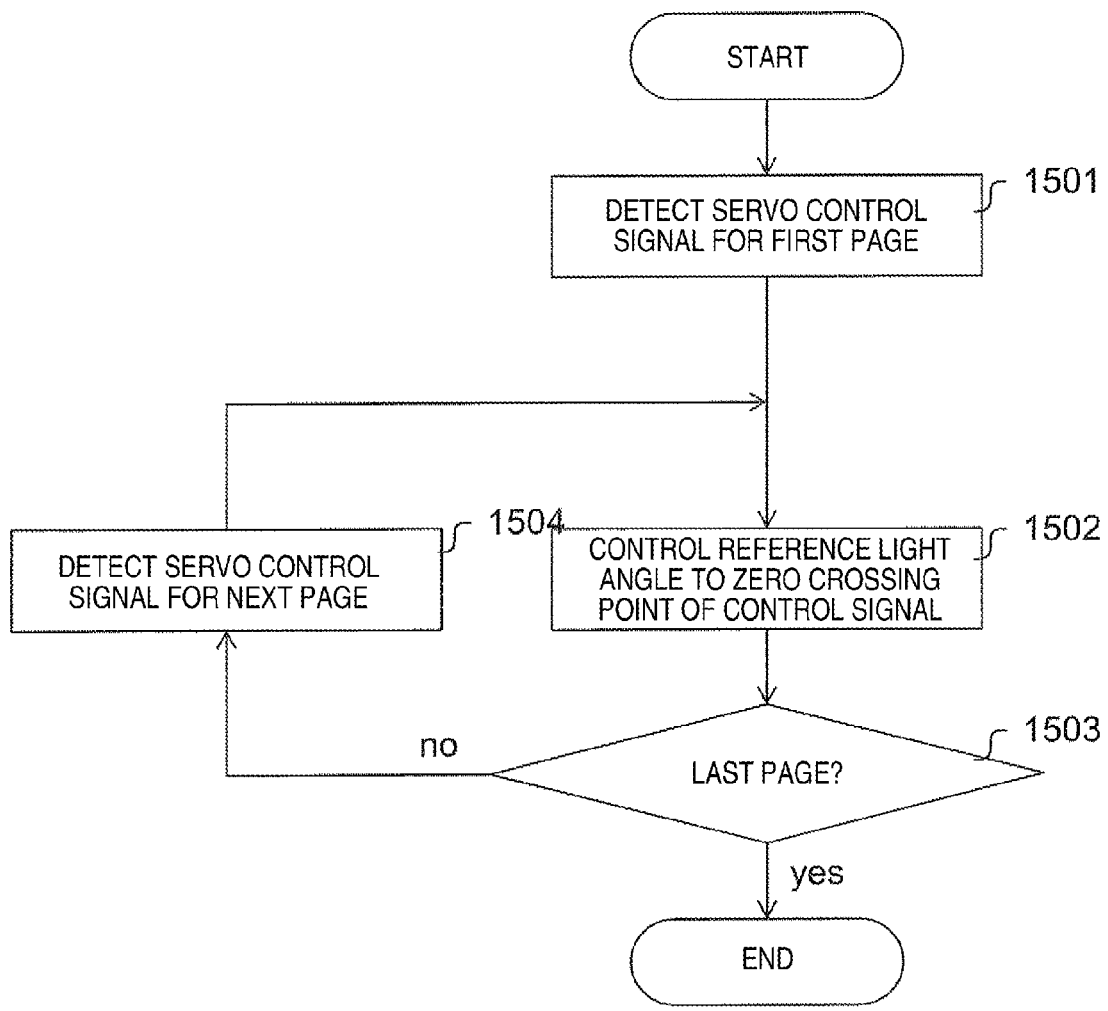

OPTICAL INFORMATION REPRODUCTION DEVICE AND OPTICAL INFORMATION REPRODUCTION METHOD

TECHNICAL FIELD

The present invention relates to an optical information reproduction device and an optical information reproduction method for reproducing information using holography.

BACKGROUND ART

Consumer optical disks having a recording density of about 100 GB can now be commercialized due to Blu-ray Disc (registered trademark) standards using blue-violet semiconductor laser. In the future, optical disks are expected to have a capacity larger than 500 GB. However, to implement the optical disks having such a super high density, a novel-type densification technique is required which is different from a conventional densification technique involving shorter wavelength and higher NA of an objective lens.

For example, a technique for eliminating reflected light from the surface of a disk is disclosed in JP-A-2010-2575 (Patent Literature 1). According to JP-A-2010-2575, "an angle, which is formed between the direction of reflected light 15 that is incident light 11 reflected on a surface 3f of a hologram recording medium 3 and the direction of an optical axis of reproduction signal light 14, is larger than a diverging angle θ of the reproduction signal light 14. Accordingly, since the reflected light 15 is shielded by a pinhole filter 5 and a lens barrel 8, the reflected light 15 is not made incident on a light detector 7 as stray light. As a result, the quality of reproduction signals can be improved".

CITATION LIST

Patent Literature

PATENT LITERATURE 1: JP-A-2010-2575

SUMMARY OF INVENTION

Technical Problem

Since the optical information reproduction device using holography has a low diffraction efficiency from a disk, the amount of reference light reflected from the surface of the disk is relatively large as compared with the amount of reproduction light from the disk. This causes a problem of deteriorated signal quality or deteriorated quality of various control signals. The technique disclosed in Patent Literature 1 is based on the assumption that the angle of signal light can be separated from the angle of reference light reflected from the surface of the disk. Accordingly, the technique is ineffective in the case where the angle of reference light reflected from the surface of the disk overlaps with an angle component of the signal light.

The present invention has been made in view of the above-stated problem, and it is an object of the present invention to provide an optical information reproduction device using holography and a method therefor, capable of reducing the influence of reference light reflected from the surface of a disk and thereby reproducing data in a stable manner.

Solution to Problem

The above problem may be solved by, for example, the invention within the scope of claims.

Advantageous Effects of Invention

According to the present invention, it becomes possible to provide an optical information recording and reproduction device and a method therefor, capable of reducing the influence of reference light reflected from the surface of a disk in a holographic memory and thereby reproducing data in a stable manner.

BRIEF DESCRIPTION OF DRAWINGS

FIG. 14 is a schematic view illustrating an embodiment of a shielding filter in the pickup in the optical information recording and reproduction device.

FIG. 15 is a schematic view illustrating an embodiment of an operation flow of reference light angle control in the optical information recording and reproduction device.

DESCRIPTION OF EMBODIMENTS

Hereinbelow, the embodiments of the present invention will be described with reference to the accompanying drawings.

First Embodiment

A first embodiment in the present invention will be described with reference to FIGS. 1 to 15.

Figure 1:
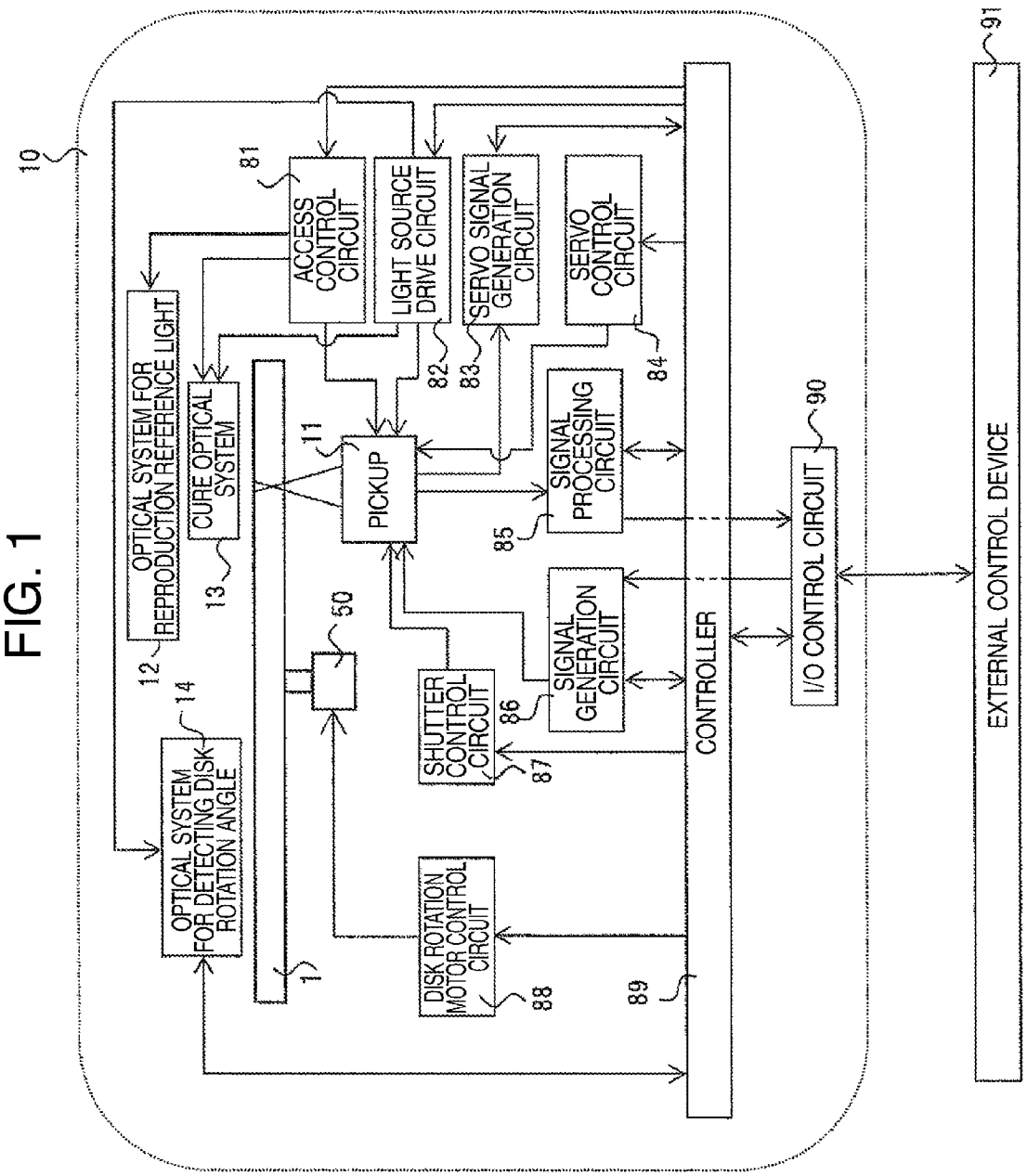
FIG. 1 is a schematic view illustrating an embodiment of an optical information recording and reproduction device.

FIG. 1 is a block diagram illustrating a recording and reproduction device for an optical information recording medium that records and/or reproduces digital information using holography.

The optical information recording and reproduction device 10 is connected to an external control device 91 via an I/O control circuit 90. In the case of recording, the optical information recording and reproduction device 10 receives an information signal to be recorded from the external control device 91 through the I/O control circuit 90. In the case of reproduction, the optical information recording and reproduction device 10 transmits a reproduction information signal to the external control device 91 through the I/O control circuit 90.

The optical information recording and reproduction device 10 includes a pickup 11, an optical system for reproduction reference light 12, a cure optical system 13, an optical system for detecting disk rotation angle 14, and a rotary motor 50. The optical information recording medium 1 is configured to be rotatable with the rotary motor 50.

The pickup 11 plays the role of emitting reference light and signal light to the optical information recording medium 1 to record digital information on a recording medium using holography. In this case, the controller 89 sends an information signal to be recorded into a spatial light modulator in the pickup 11 via a signal generation circuit 86, so that the signal light is modulated by the spatial light modulator.

In the case of reproducing the information recorded on the optical information recording medium 1, the optical system for reproduction reference light 12 generates a light wave to make the reference light emitted from the pickup 11 incident on the optical information recording medium in a direction opposite to that in the case of recording. A later-described light detector in the pickup 11 detects reproduction light reproduced with the reproduction reference light, and the signal processing circuit 85 reproduces a signal.

The time of irradiating the optical information recording medium 1 with the reference light and the signal light can be adjusted by the controller 89 controlling opening and closing time of a shutter in the pickup 11 via a shutter control circuit 87.

The cure optical system 13 plays the role of generating an optical beam for use in precure and postcure of the optical information recording medium 1. The precure is a preprocess performed in the case of recording information on a desired position in the optical information recording medium 1, in which the desired position is irradiated with a specified optical beam in advance before being irradiated with the reference light and the signal light. The postcure is a post-process performed after the information is recorded on the desired position in the optical information recording medium 1, in which the desired position is irradiated with a specified optical beam to disable additional recording thereon.

The optical system for detecting disk rotation angle 14 is used in order to detect a rotation angle of the optical information recording medium 1. When the optical information recording medium 1 is adjusted to a specified rotation angle, the optical system for detecting disk rotation angle 14 can detect a signal corresponding to the rotation angle, and the controller 89 can control the rotation angle of the optical information recording medium 1 with the detected signal through the disk rotation motor control circuit 88.

A light source drive circuit 82 supplies a specified light source drive current to the light sources in the pickup 11, the cure optical system 13, and the optical system for detecting disk rotation angle 14, and each of the light sources can emits an optical beam with a specified light amount.

The pickup 11 and the cure optical system 13 are equipped with a mechanism that can slide their positions in a radial direction of the optical information recording medium 1, so that position control is performed via the access control circuit 81.

The recording technique using the principles of angle multiplexing of holography tends to have an extremely small allowable error with respect to deviation of a reference light angle.

Therefore, it is necessary to provide a mechanism for detecting a deviation amount of the reference light angle in the pickup 11, to generate a signal for servo control in a servo signal generation circuit 83, and to provide a servo-mechanism in the optical information recording and reproduction device 10 for correcting the deviation amount via a servo control circuit 84. In the present invention, part of a reproduction signal from a hologram, which is for generating a servo control signal as described later, is shielded to enhance the resistance to wavelength shift and angular deviation in a direction perpendicular to the multiplex direction of the reference light.

Some or all the optical system components constituting the pickup 11, the cure optical system 13, and the optical system for detecting disk rotation angle 14 may be integrated to simplify the system.

Figure 2:
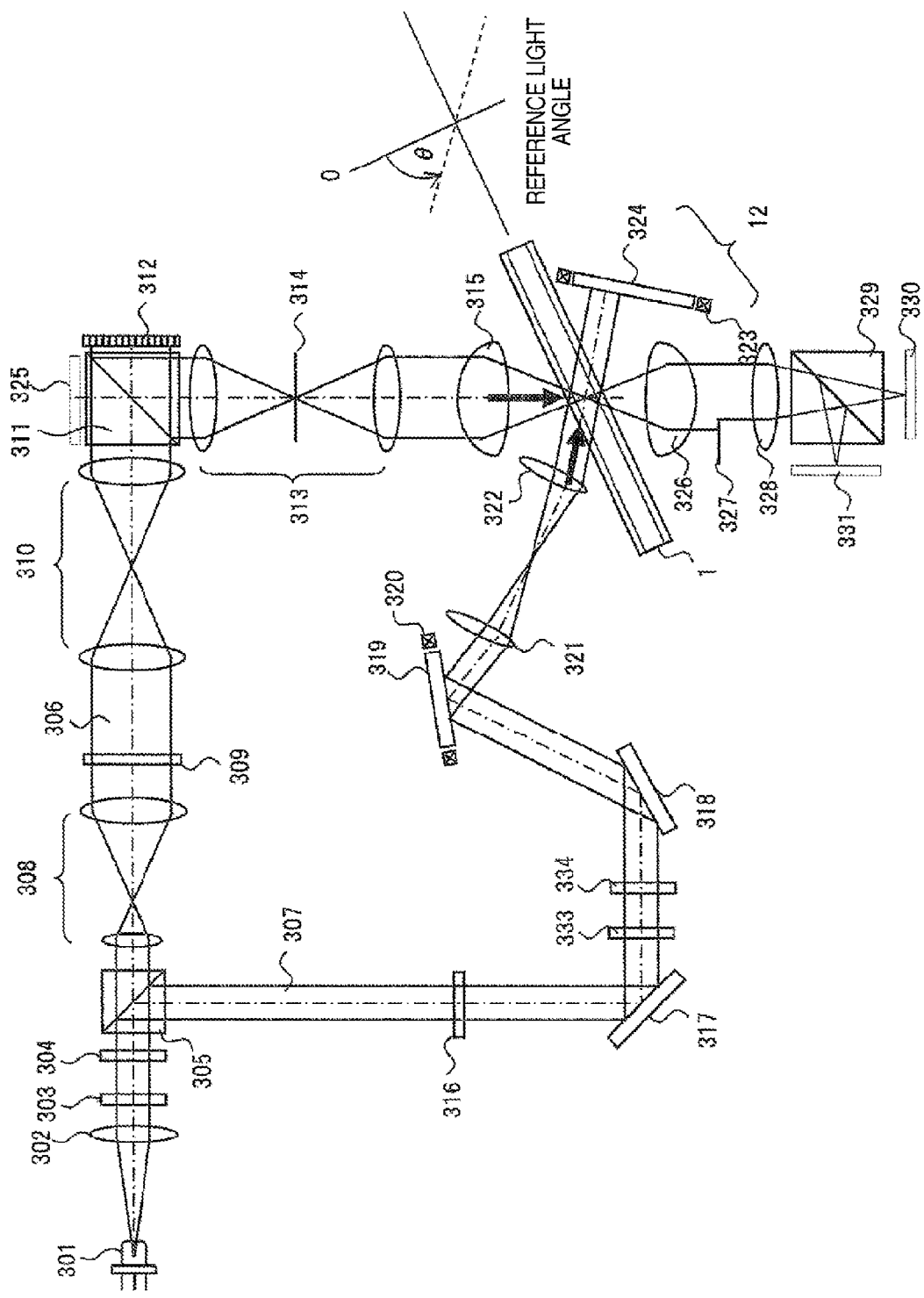
FIG. 2 is a schematic view illustrating an embodiment of a pickup in the optical information recording and reproduction device.

FIG. 2 illustrates the principles of recording in one example of the basic optical system configuration of the pickup 11 in the optical information recording and reproduction device 10. An optical beam emitted from a light source 301 passes through a collimator lens 302, and is incident on a shutter 303. When the shutter 303 is open, the optical beam passes through the shutter 303, and then a polarization direction of the optical beam is controlled in such a way that a light amount ratio between p polarization and s polarization becomes a desired ratio by an optical element 304 constituted of, for example, a half-wave plate or the like. Then, the optical beam is incident on a polarization beam splitter (PBS) prism 305.

The optical beam that passed through the PBS prism 305 functions as signal light 306, whose optical beam diameter is expanded by a beam expander 308. The signal light 306 then passes through a phase mask 309, a relay lens 310, and a PBS prism 311, and is incident on a spatial light modulator 312.

The signal light having information added thereto by the spatial light modulator 312 is reflected by the PBS prism 311, and propagates through a relay lens 313 and a spatial filter 314. The signal light is then collected on the optical information recording medium 1 by an objective lens 315.

Meanwhile, the optical beam reflected by the PBS prism 305 functions as reference light 307, which is set by a polarization direction transducer 316 to have a specified polarization direction depending on recording operation or reproducing operation. The reference light 307 then travels through a mirror 317 and a mirror 318 and is incident on a galvanomirror 319. In this case, at the time of reproduction, the polarization direction is slightly changed with a wave plate 333 so as to generate a servo light component in addition to a normal reproduction light component. In this drawing, p polarization is a reproduction light component and s polarization is a servo light component.

Then, angles of p polarization and s polarization in a multiplexing direction are separated by a desired angle with a polarization separation element 334 such as a Wollaston prism. At the time of recording, the wave plate 333 is set to an angle which does not cause a change in the polarization direction. Since the angle of the galvanomirror 319 can be adjusted with an actuator 320, the reference light which is incident on the optical information recording medium 1 after passing through the lens 321 and the lens 322 may have the angle of incidence set to a desired angle. In order to set the angle of incidence of the reference light, an element for converting the wavefront of the reference light may be used in place of the galvanomirror.

In this specification, as illustrated in the drawing, the reference light angle in a direction perpendicular to the optical information recording medium is defined as 0 degree, and the reference light angles in a direction large in a scan range and in a direction opposite thereto in a plane containing at least two or more reference light beams, whose angles are changed by the actuator 320, are defined as a plus direction and a minus direction, respectively.

Thus, when the signal light and the reference light are made incident on the optical information recording medium 1 so as to be superimposed upon each other, an interference fringe pattern is formed in the recording medium. By writing the pattern to the recording medium, information is recorded. Since the angle of incidence of the reference light incident on the optical information recording medium 1 can be changed with the galvanomirror 319, angle-multiplexing recording becomes possible.

Hereinafter, holograms recorded on the same area at different reference light angles are referred to as pages, which have one-to-one correspondence with the reference light angles. A set of the pages which are angle-multiplexed in the same area is referred to as a book.

Figure 3:
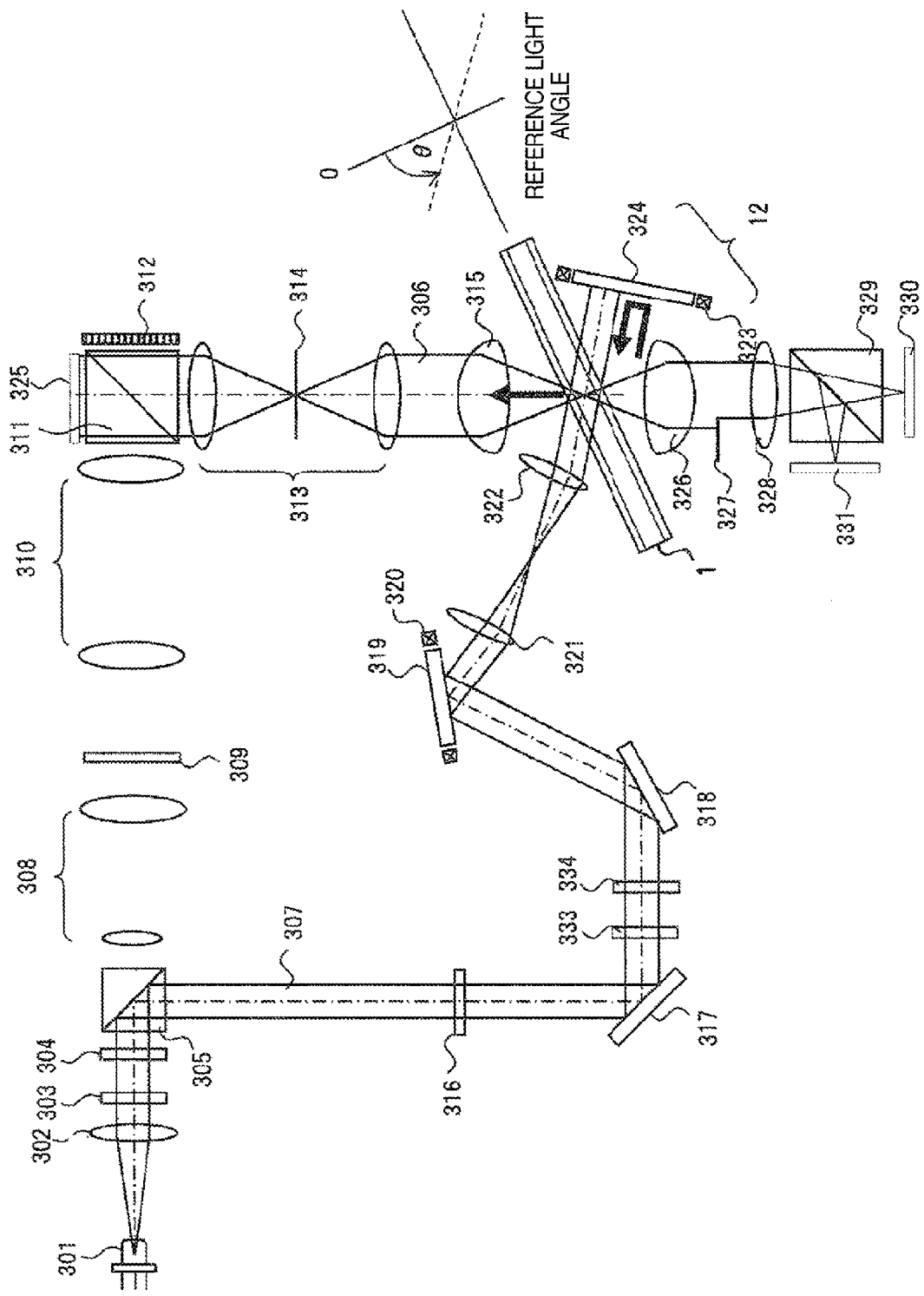
FIG. 3 is a schematic view illustrating an embodiment of the pickup in the optical information recording and reproduction device.

FIG. 3 illustrates the principles of reproduction in one example of the basic optical system configuration of the pickup 11 in the optical information recording and reproduction device 10. When the recorded information is reproduced, the reference light is made incident on the optical information recording medium 1, and the optical beam that passed the optical information recording medium 1 is reflected by the galvanomirror 324 whose angle can be adjusted by the actuator 323 as described before. As a result, reproduction reference light is generated.

The reproduction light reproduced by the reproduction reference light propagates through the objective lens 315, the relay lens 313, and the spatial filter 314. Then, the reproduction light passes through the PBS prism 311, and is incident on a light detector 325 so that a recorded signal can be reproduced. Although imaging elements such as a CMOS image sensor and a CCD image sensor can be used as the light detector 325, any element can be used as long as page data can be reproduced.

The servo control signal for controlling the galvanomirror 319 that sets the reference light angle is generated by an optical system below the disk 1 as illustrated in the drawing, for example. After the reproduction light from a hologram is made into parallel light by a lens 326 and is then made into convergence light by, for example, a lens 328, p polarization and s polarization of the light are separated by a PBS prism 329, and the respective light beams are detected by light detectors 330 and 331. In this case, a shielding filter 327 shields the reference light reflected from the surface of the disk 1 and traveling downward in the drawing. For example, the servo control signal is calculated by performing differential operation of the signals obtained in the light detectors 330 and 331. In this case, differential operation may be performed after the signals obtained in the light detectors 330 and 331 are corrected so that their maximum values and minimum values become equal, respectively.

For example, when the above-mentioned control signal obtained by differential operation is used, the disk is irradiated with s polarization light and p polarization light which are incident on the upper surface of the disk in the state of being intentionally deviated, in a direction opposite to each other, from an angle optimum for reproduction of a hologram. When the light is reflected by the galvanomirror 324, an angle is changed by one half of the separation angle of s polarization and p polarization in order to provide an angle optimum for reproduction of the hologram. Note that the shielding filter may be an opening which physically shields the light, or a liquid crystal element which electrically controls shielding and transmission. In the present embodiment, an example of using two lenses, the lens 326 and the lens 328, has been described. However, one lens may be used instead.

In the case where, for example, the above-mentioned control signal obtained by differential operation is used, the disk is irradiated with s polarization light and p polarization light which are incident on the upper surface of the disk in the state of being deviated, in the direction opposite to each other, from the angle optimum for reproduction of a hologram. Accordingly, after control is performed with a zero crossing point of the control signal, the reference light angle may be changed by a specified angle, such as one half of the separation angle of s polarization and p polarization, by using an encoder of the galvanomirror, for example, and the changed reference light angle may be used as an optimum angle. In this case, when the light is reflected by the galvanomirror 324, the reference light having an optimum angle may be reflected perpendicularly, for example.

Figure 4:
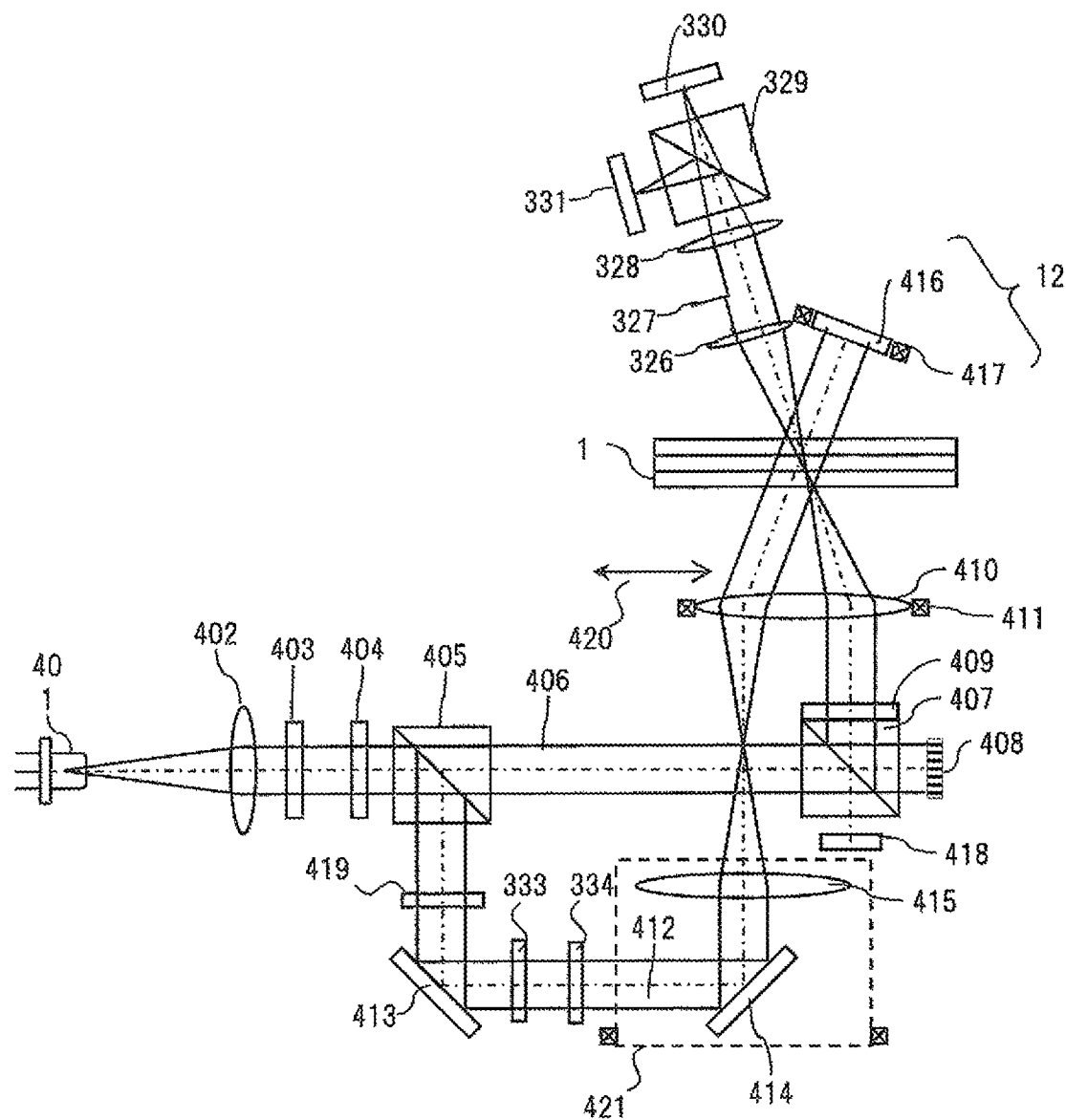
FIG. 4 is a schematic view illustrating an embodiment of the pickup in the optical information recording and reproduction device.

FIG. 4 illustrates another configuration of the pickup 11. In FIG. 4, an optical beam emitted from a light source 401 passes through a collimator lens 402, and is incident on the shutter 403. When the shutter 403 is open, the optical beam passes through the shutter 403, and then a polarization direction of the optical beam is controlled in such a way that a light amount ratio between p polarization and s polarization becomes a desired ratio by an optical element 404 constituted of, for example, a half-wave plate or the like. Then, the optical beam is incident on a PBS prism 405.

The optical beam that passed through the PBS prism 405 is incident on a spatial light modulator 408 via a PBS prism 407. Signal light 406 having information added thereto by the spatial light modulator 408 is reflected by the PBS prism 407, and propagates through an angle filter 409 which passes only the optical beam with a specified angle of incidence. The signal light beam is then collected on the hologram recording medium 1 by an objective lens 410.

Meanwhile, the optical beam reflected by the PBS prism 405 functions as reference light 412, which is set by a polarization direction transducer 419 to have a specified polarization direction depending on recording operation or reproducing operation. The optical beam then travels through a mirror 413 and a mirror 414, and is incident on a lens 415. The lens 415 plays the role of collecting the reference light 412 on a back focus surface of the objective lens 410. The reference light once collected on the back focus surface of the objective lens 410 is made into parallel light by the objective lens 410 again, and is incident on the hologram recording medium 1. In this case, at the time of reproduction, the polarization direction is slightly changed with a wave plate 333 so as to generate a servo light component in addition to a normal reproduction light component. In this drawing, p polarization is a reproduction light component and s polarization is a servo light component. Then, angles of p polarization and s polarization in the multiplexing direction are separated by a desired angle with the polarization separation element 334 such as a Wollaston prism. At the time of recording, the wave plate 333 is set to an angle which does not cause a change in the polarization direction.

Figure 20:
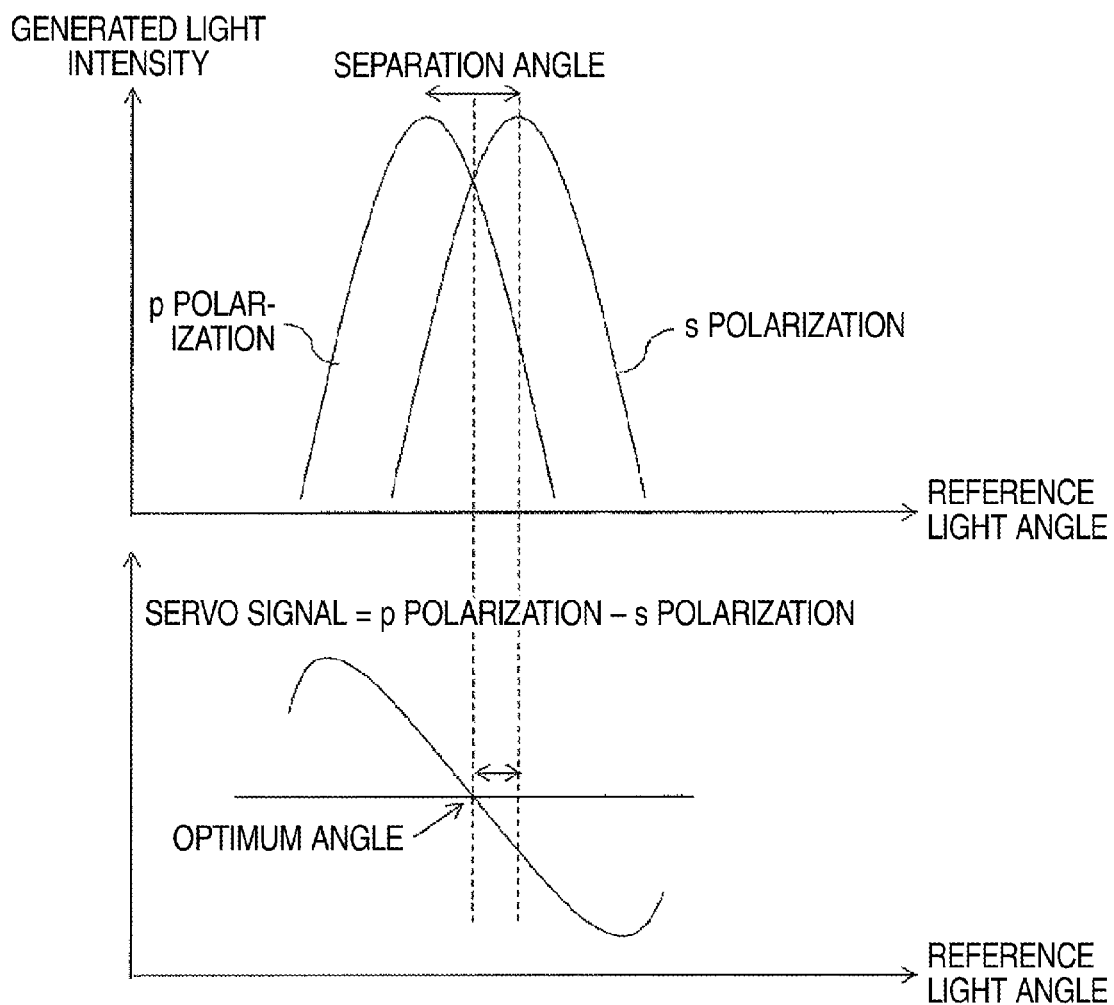
FIG. 20 illustrates an example of a Bragg selectivity curve of a reproduction signal and an angle error signal (servo signal) of reference light in the optical information recording and reproduction device in an ideal state.

Diffracted light reproduced by s polarization and diffracted light reproduced by p polarization have peaks appearing at the positions where the reference light angle is deviated by an angle corresponding to a separation angle obtained by a polarization separation element such as a Wollaston prism as illustrated in FIG. 20. In this case, a signal representing a difference between the diffracted light of p polarization and the diffracted light of s polarization has an S-shaped waveform as illustrated in the lower graph of FIG. 20. When the S-shaped waveform is used as an angle error signal of the reference light, the signal can be used to control the element, such as a galvanomirror, which is configured to change the reference light angle.

Here, the objective lens 410 or an optical block 421 can be driven, for example, in a direction designated by reference numeral 420. Shifting the position of the objective lens 410 or the optical block 421 along the driving direction 420 changes the relative position relationship between the objective lens 410 and the focal point on the back focus surface of the objective lens 410. Accordingly, it becomes possible to set the angle of incidence of the reference light incident on the hologram recording medium 1 to a desired angle. The angle of incidence of the reference light may be set to a desired angle by driving the mirror 414 with an actuator instead of driving the objective lens 410 or the optical block 421.

Thus, when the signal light and the reference light are made incident on the hologram recording medium 1 so as to be superimposed upon each other, an interference fringe pattern is formed in the recording medium. By writing the pattern to the recording medium, information is recorded. Since the angle of incidence of the reference light incident on the hologram recording medium 1 can be changed by shifting the position of the objective lens 410 or the optical block 421 along the driving direction 420, angle-multiplexing recording becomes possible.

When the recorded information is reproduced, the reference light is made incident on the hologram recording medium 1 as described before, and the optical beam that passed the hologram recording medium 1 is reflected by a galvanomirror 416 whose angle is adjustable by an actuator 417. As a result, reproduction reference light is generated. The reproduction light reproduced by the reproduction reference light propagates through the objective lens 410 and the angle filter 409. Then, the reproduction light passes through the PBS prism 407, and is incident on a light detector 418 so that a recorded signal can be reproduced.

The servo control signal for controlling the galvanomirror 414 that sets the reference light angle is generated by an optical system above the disk 1 as illustrated in the drawing, for example. After the reproduction light from a hologram is made into parallel light by the lens 326, and is then made into convergence light by the lens 328 for example, p polarization and s polarization of the light are separated by the PBS prism 329, and the respective light beams are detected by the light detectors 330 and 331.

In this case, the shielding filter 327 shields the reference light reflected from the surface of the disk 1 and traveling upward in the drawing. For example, the servo control signal is calculated by performing differential operation of the signals obtained in the light detectors 330 and 331. In this case, differential operation may be performed after the signals obtained in the light detectors 330 and 331 are corrected so that their maximum values and minimum values become equal, respectively.

For example, when the above-mentioned control signal obtained by differential operation is used, the disk is irradiated with s polarization light and p polarization light which are incident on the lower surface of the disk in the state of being intentionally deviated, in a direction opposite to each other, from an angle optimum for reproduction of the hologram. When the light is reflected by the galvanomirror 416, the angle is changed to an angle optimum for reproduction of the hologram. In the present embodiment, an example of using two lenses, the lens 326 and the lens 328, has been described. However, one lens may be used instead.

The optical system illustrated in FIG. 4, which is configured so that signal light and reference light are made incident on the same objective lens, has an advantage of considerable downsizing over the optical system configured as illustrated in FIG. 2.

Figure 5C:
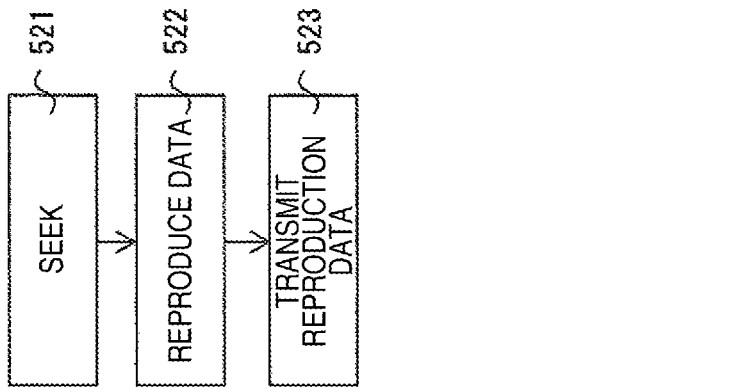
FIGS. 5A-5C are a schematic view illustrating embodiments of operation flows of the optical information recording and reproduction device.
Figure 5B:
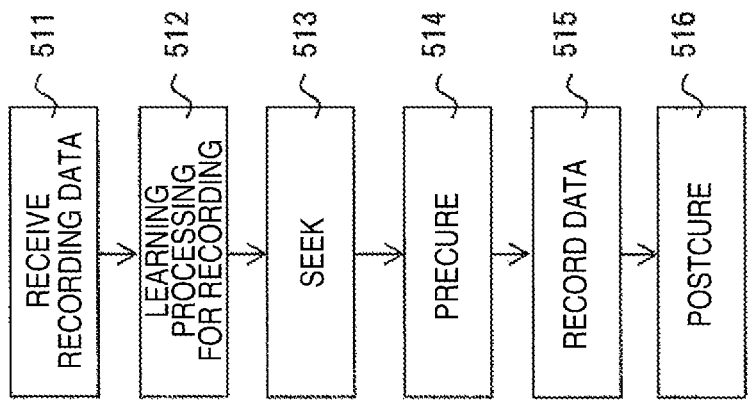
Figure 5A:
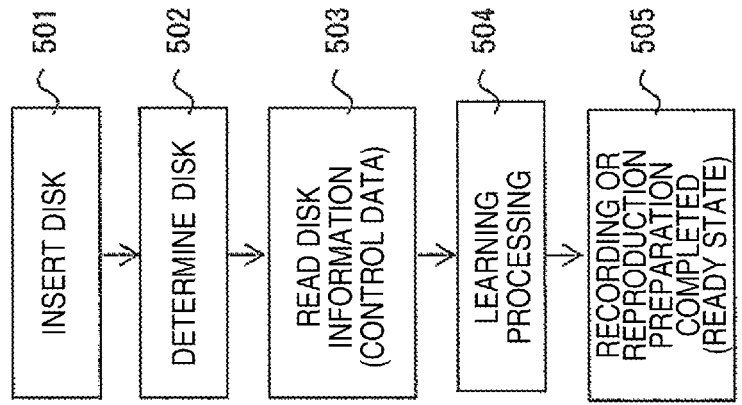

FIG. 5 illustrates operation flows of recording and reproduction in the optical information recording and reproduction device 10. Here, a description is given of the flows concerning the recording and reproduction using holography in particular.

The (a) of FIG. 5 illustrates an operation flow from insertion of the optical information recording medium 1 into the optical information recording and reproduction device 10 to completion of preparation for recording or reproduction. The (b) of FIG. 5 illustrates an operation flow from a preparation completed state to recording of information on the optical information recording medium 1. The (c) of FIG. 5 illustrates an operation flow from the preparation completed state to reproduction of the information recorded on the optical information recording medium 1.

As illustrated in the (a) of FIG. 5, when a medium is inserted (501), the optical information recording and reproduction device 10 performs disk determination that is, for example, to determine whether or not the inserted medium is a medium for recording and reproduction of digital information using holography (502).

If it is determined as a result of the disk determination that the medium is an optical information recording medium for recording and reproduction of digital information using holography, the optical information recording and reproduction device 10 reads control data provided in the optical information recording medium (503) to acquire information, such as information regarding the optical information recording medium, and information regarding various setting conditions for recording and reproduction.

After the control data is read, the optical information recording and reproduction device 10 performs various adjustments and learning processing concerning the pickup 11 in accordance with the control data (504), so that preparation of recording or reproduction is completed (505).

As illustrated in the (b) of FIG. 5, in the operation flow from the preparation completed state to recording of information, recording data is first received (511), and the information corresponding to the data is sent into the spatial light modulator in the pickup 11.

Then, various learning processes for recording, such as power optimization of the light source 301 and optimization of exposure time by the shutter 303, are performed in advance as necessary, so that high-quality information can be recorded on the optical information recording medium (512).

Then, in seek operation (513), the access control circuit 81 is controlled to position the pickup 11 and the cure optical system 13 at specified positions of the optical information recording medium. When the optical information recording medium 1 has address information, the address information is reproduced to confirm whether the pickup 11 and the cure optical system 13 are positioned at target positions. When they are not positioned at the target positions, the amount of deviation from the specified positions is calculated, and positioning operation is repeated again.

Then, a specified area is precured using an optical beam emitted from the cure optical system 13 (514), and data is recorded using reference light and signal light emitted from the pickup 11 (515).

After the data is recorded, postcure is performed using an optical beam emitted from the cure optical system 13 (516). The data may be verified as necessary.

As illustrated in the (c) of FIG. 5, in the operation flow from the preparation completed state to reproduction of the recorded information, the access control circuit 81 is first controlled to position the pickup 11 and the optical system for reproduction reference light 12 at specified positions of the optical information recording medium in seek operation (521). When the optical information recording medium 1 has address information, the address information is reproduced to confirm whether the pickup 11 and the cure optical system 13 are positioned at target positions. When they are not positioned at the target positions, the amount of deviation from the specified positions is calculated, and positioning operation is repeated again.

Then, the reference light is emitted from the pickup 11 to read the information recorded on the optical information recording medium (522), and reproduction data is transmitted (513).

Figure 6B:
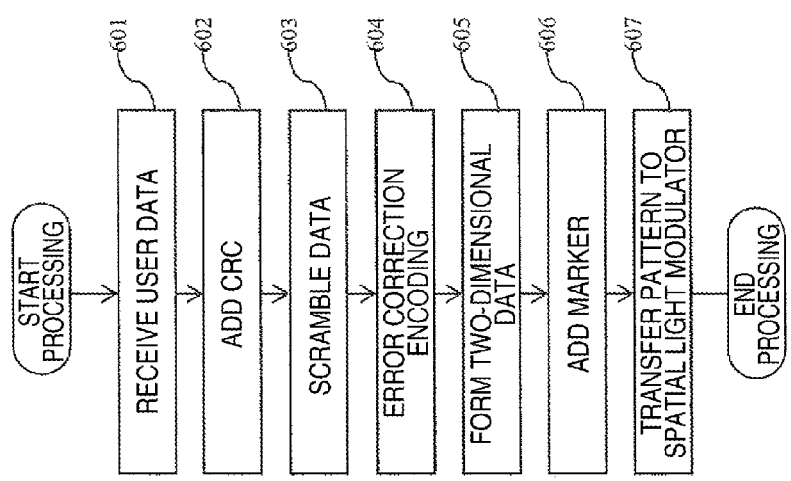
FIGS. 6A and 6B are a schematic view illustrating embodiments of operation flows of a signal generation circuit and a signal processing circuit.
Figure 6A:
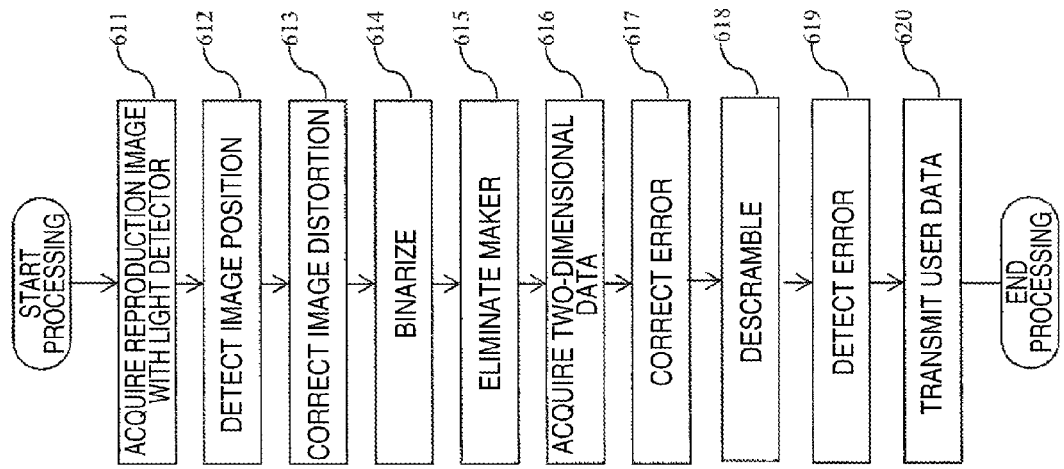

FIG. 6 illustrates data processing flows at the time of recording and reproduction. The (a) of FIG. 6 illustrates a recording data processing flow in the signal generation circuit 86, from reception of the recording data in an I/O control circuit 90 (511) to conversion into two-dimensional data on the spatial light modulator 312. The (b) of FIG. 6 illustrates a reproduction data processing flow in the signal processing circuit 85, from detection of two-dimensional data in the light detector 325 to transmission of reproduction data in the I/O control circuit 90 (624).

A description is given of data processing at the time of recording with reference to the (a) of FIG. 6. When user data is received (601), the data is divided into a plurality of data streams, and the data streams are each provided with a CRC code to enable error detection to be executed at the time of reproduction (602). The number of on-pixels and the number of off-pixels in the data streams are made equal, and the data streams are each scrambled by adding a pseudo-random number data stream thereto for the purpose of preventing repetition of the same pattern (603). Then, error correcting encoding (604) is performed by using a Reed Solomon code and the like to enable error correction to be executed at the time of reproduction. Next, the data streams are each converted into two-dimensional data of M×N. By repeating this process for data of one page, two-dimensional data of one page (605) is constructed. To the two-dimensional data constructed in this way, a marker used as a reference in detection of an image position and in correction of image distortion at the time of reproduction is added (606), and the data is transmitted to the spatial light modulator 312 (607).

A description is now given of the data processing flow at the time of reproduction with reference to the (b) of FIG. 6. Image data detected in the light detector 325 is transmitted to the signal processing circuit 85 (611). An image position is detected based on the marker contained in the image data (612), and inclination, magnification, and distortion of the image are corrected (613). Then, the image data is binarized (614), and the marker is deleted (615) to acquire two-dimensional data of one page (616). The thus-obtained two-dimensional data is converted into a plurality of data streams, and error correction processing is performed (617) to remove a parity data stream. Next, after descrambling (618) is executed, and error detection processing is executed using the CRC code (619) to delete CRC parity, the user data is transmitted via the I/O control circuit 90 (620).

Figure 7:
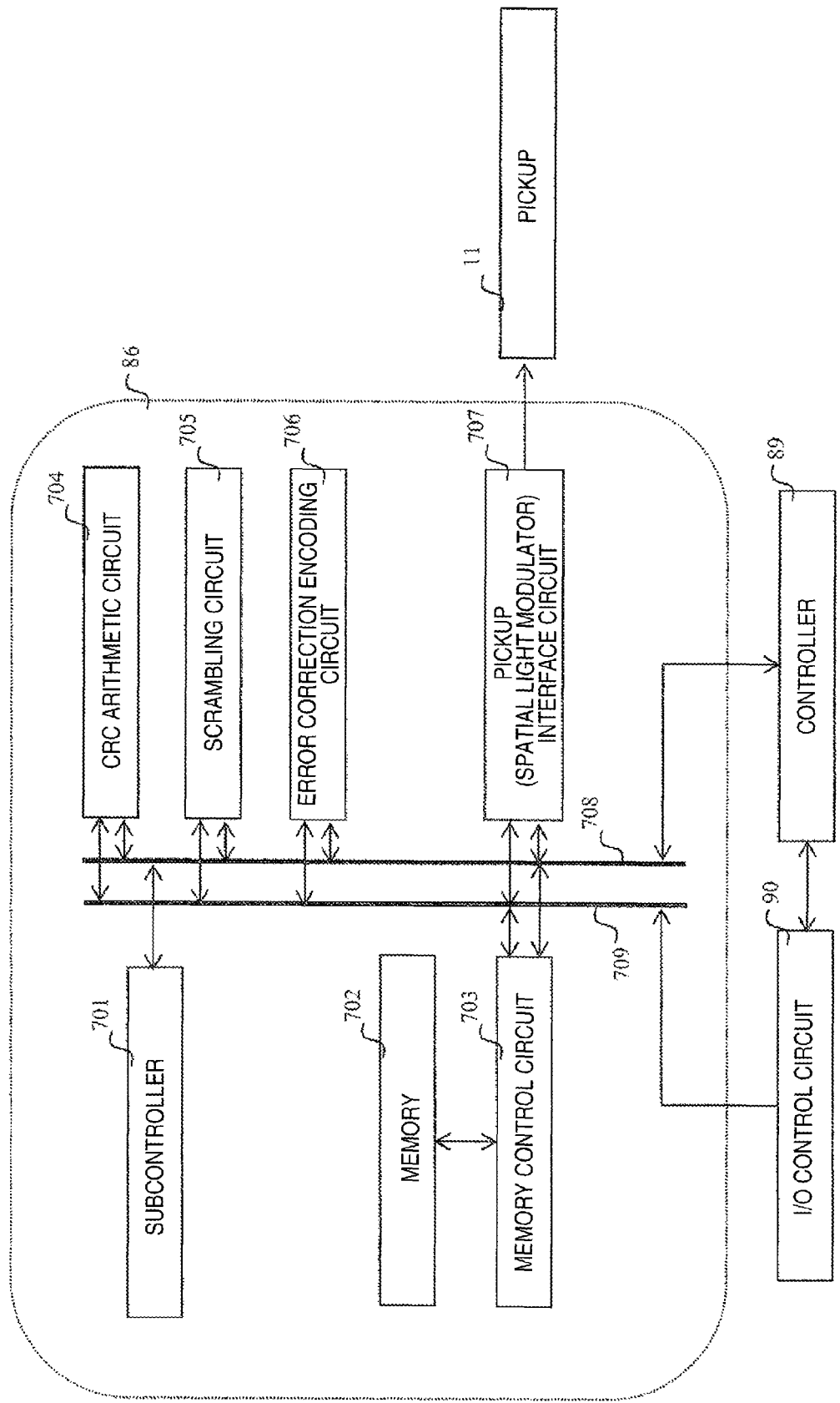
FIG. 7 is a schematic view illustrating an embodiment of the signal generation circuit in the optical information recording and reproduction device.

FIG. 7 is a block diagram of the signal generation circuit 86 of the optical information recording and reproduction device 10.

When user data starts to be input into the I/O control circuit 90, the I/O control circuit 90 notifies the controller 89 of the start of user data input. Upon reception of the notification, the controller 89 instructs the signal generation circuit 86 to execute processing of recording the data of one page input from the I/O control circuit 90. The processing instruction from the controller 89 is notified to a subcontroller 701 in the signal generation circuit 86 via a control line 708. Upon reception of the notification, the subcontroller 701 controls each signal processing circuit via the control line 708 so that each signal processing circuit operates in parallel.

First, control is performed so that the user data input from the I/O control circuit 90 into a memory control circuit 703 via a data line 709 is stored in a memory 702. When the amount of user data stored in the memory 702 reaches a certain amount, a CRC arithmetic circuit 704 is controlled to add a CRC code to the user data.

Next, control is performed so that a scrambling circuit 705 scrambles the CRC-added data by adding a pseudo-random number data stream to the data and an error correction encoding circuit 706 performs error correction encoding that is to add a parity data stream to the data. Finally, a pickup interface circuit 707 is made to read the error correction encoded data from the memory 702 in order of the two-dimensional data arranged on the spatial light modulator 312. After a marker used as a reference at the time of reproduction is added to the two-dimensional data, the data is transmitted to the spatial light modulator 312 in the pickup 11.

Figure 8:
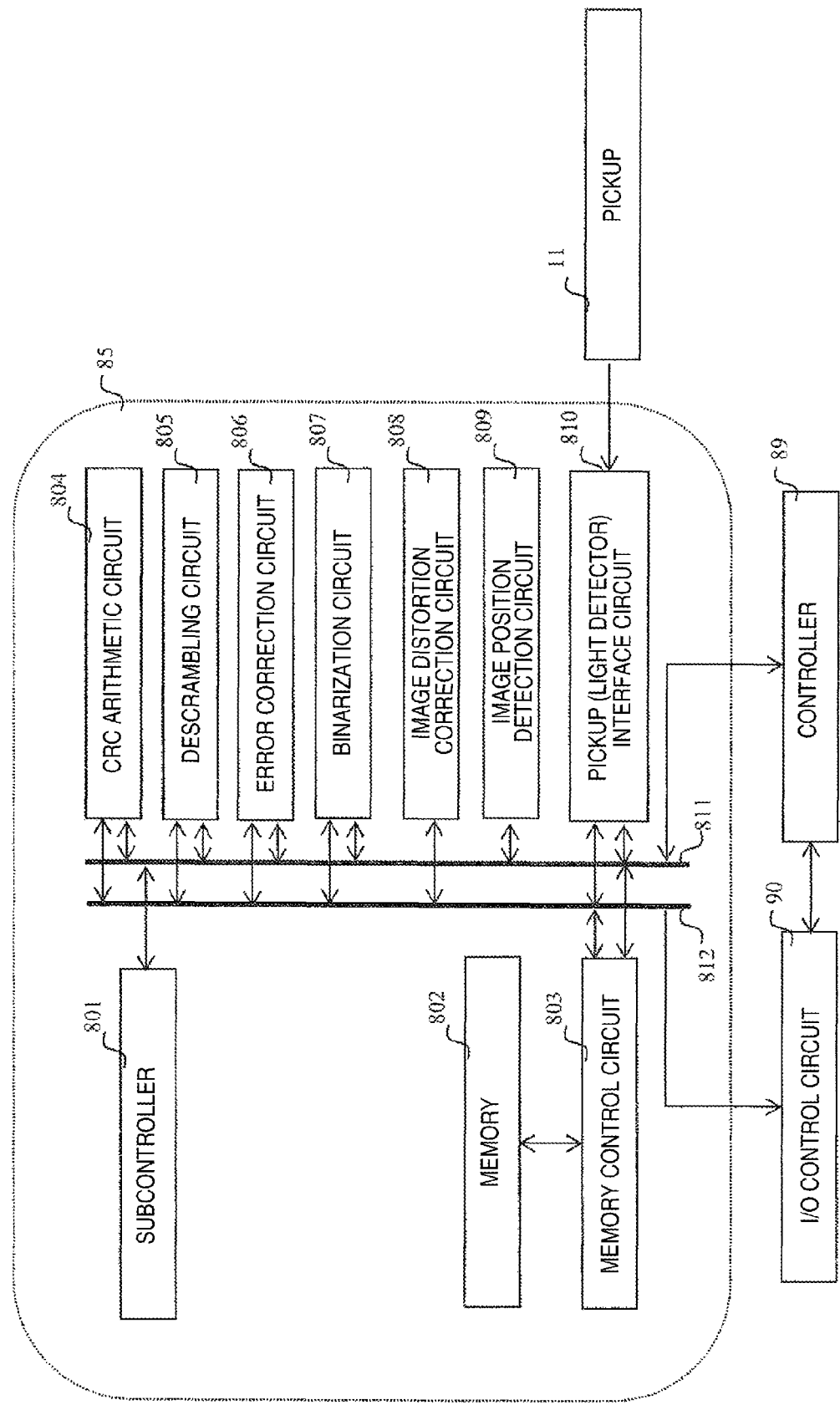
FIG. 8 is a schematic view illustrating an embodiment of a signal processing circuit in the optical information recording and reproduction device.

FIG. 8 is a block diagram of the signal processing circuit 85 of the optical information recording and reproduction device 10.

When the light detector 325 in the pickup 11 detects image data, the controller 89 instructs the signal processing circuit 85 to perform processing of reproducing data of one page input from the pickup 11. The processing instruction from the controller 89 is notified to a subcontroller 801 in the signal processing circuit 85 via a control line 811. Upon reception of the notification, the subcontroller 801 controls each signal processing circuit via the control line 811 so that each signal processing circuit operates in parallel.

First, control is performed so that the image data input from the pickup 11 into a memory control circuit 803 via a pickup interface circuit 810 and through a data line 812 is stored in a memory 802. When the amount of image data stored in the memory 802 reaches a certain amount, an image position detection circuit 809 is controlled to detect the marker from the image data stored in the memory 802 and to extract a valid data range.

Next, an image distortion correction circuit 808 is controlled to correct inclination, magnification, and distortion of the image using the detected marker and to convert the size of the image data into the size of expected two-dimensional data. A binarization circuit 807 is controlled to binarize each of a plurality of bits, which constitute the size-converted two-dimensional data, into "0" or "1" and to store the binarized data in the memory 802 in an output order of the reproduction data.

Next, the error correction circuit 806 corrects errors contained in each data stream, and a descrambling circuit 805 descrambles the data having the pseudo-random number data stream added thereto. Then, a CRC arithmetic circuit 804 confirms that no error is contained in the user data in the memory 802. Then, the user data is transmitted to the I/O control circuit 90 from the memory 802.

Figure 9A:
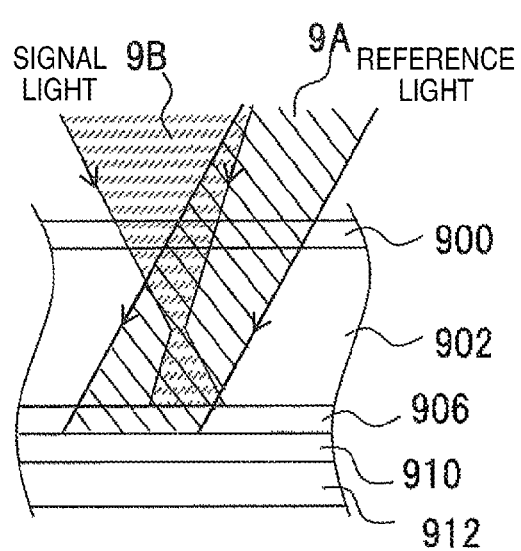
FIGS. 9A and 9B are a schematic view illustrating an embodiment of a layer structure of an optical information recording medium having a reflecting layer.
Figure 9B:
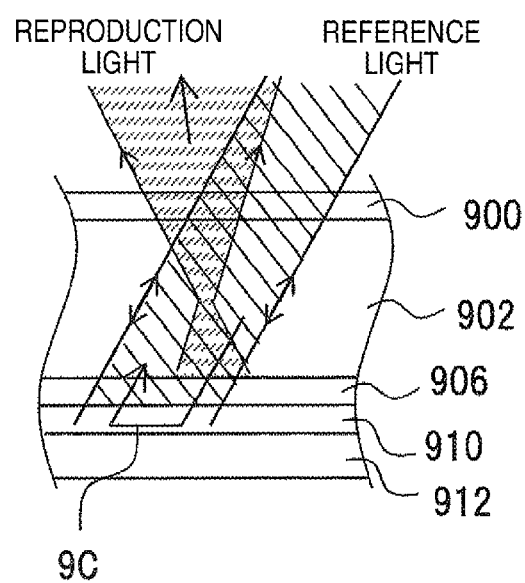

FIG. 9 illustrates a layer structure of an optical information recording medium having a reflective layer. The (a) of FIG. 9 illustrates the state of recording information on the optical information recording medium, and the (b) of FIG. 9 illustrates the state of reproducing information from the optical information recording medium.

The optical information recording medium 1 includes a transparent cover layer 900, a recording layer 902, a light absorption/light transmission layer 906, a light reflection layer 910, and a transparent protection layer 912 in order from the optical pickup 11 side. An interference pattern by reference light 9A and the signal light 9B is recorded on the recording layer 902.

The light absorption/light transmission layer 906 absorbs the reference light 9A and the signal light 9B at the time of information recording, and changes its physical property to transmit the reference light at the time of information reproduction. For example, a colored/discolored state of the light absorption/light transmission layer 906 is changed by application of voltage to the optical recording medium 1. That is, at the time of information recording, the light absorption/light transmission layer 906 is in the colored state so as to absorb the reference light 9A and the signal light 9B that passed the recording layer 902. At the time of information reproduction, the light absorption/light transmission layer 906 is in the discolored state so as to transmit the reference light (T. Ando et. al: Technical Digest ISOM (2006), Th-PP-10). Reference light 10A that passed the light absorption/light transmission layer 906 is reflected by the light reflection layer 910 to be reproduction reference light 9C.

It is possible to use WO3 as an electrochromic (EC) material, stated in A. Hirotsune et. al: Technical Digest ISOM (2006), Mo-B-04, for the light absorption/light transmission layer 906.

When voltage is applied to the material, the material is reversibly colored or discolored. At the time of information recording, the material is colored to absorb light, while at the time of information reproduction, the material is discolored to transmit light.

Since the configuration of FIG. 9 enables the reproduction reference light 9C to be generated by reflection on the light reflection layer 910, the optical system for reproduction reference light becomes unnecessary, so that the drive can be downsized.

Figure 10B:
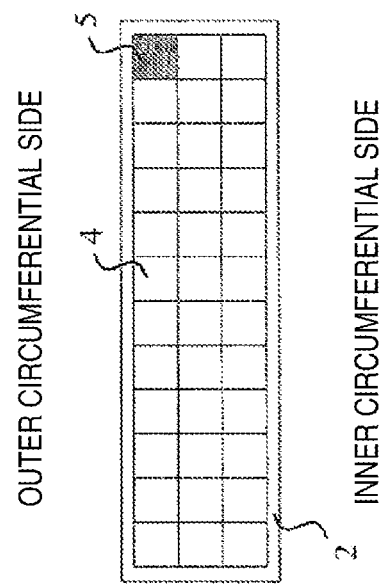
FIGS. 10A and 10B are a schematic view illustrating embodiments of the optical information recording medium and a bookcase.
Figure 10A:
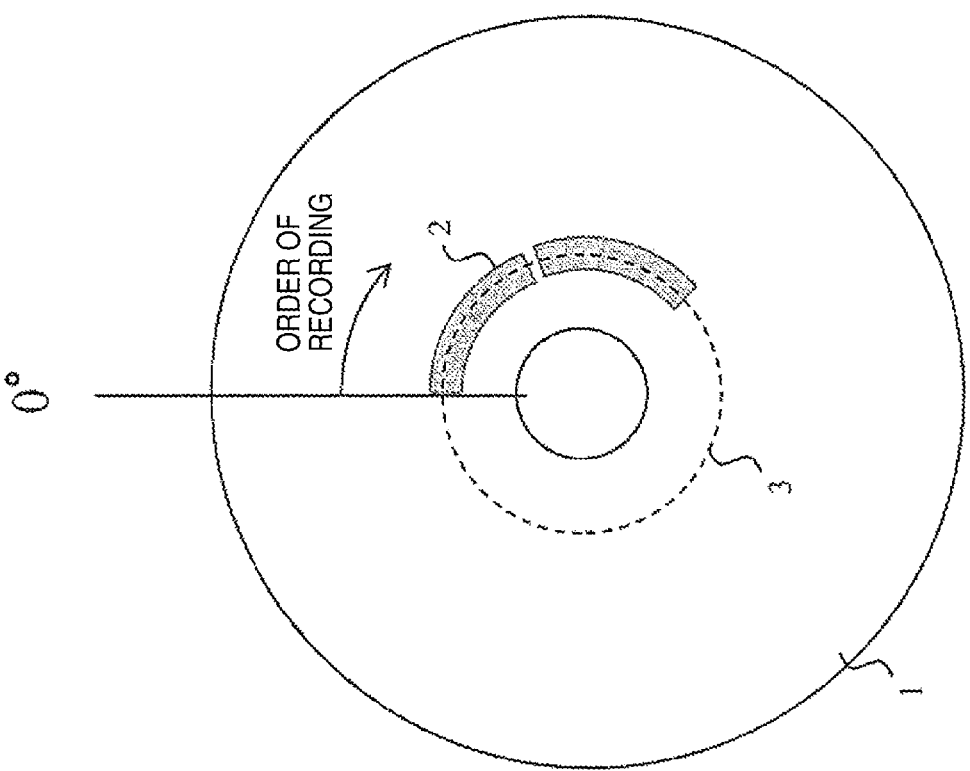

FIG. 10 is schematic view illustrating an embodiment of an optical information recording medium and a bookcase.

The (a) of FIG. 10 is a schematic view illustrating an embodiment of the optical information recording medium. For example, a track 3 is concentrically arranged in the optical information recording medium 1, and bookcases 2 are recorded on this track. A bookcase, which is a minimum unit recordable during recording operation, is constituted of a plurality of books. For example, bookcases are arranged at an interval as illustrated in the drawing. When data is recorded on the optical information recording medium, bookcases are recorded clockwise from the track on an inner circumferential side. When a first bookcase is recorded within the track, recording is performed by using a uniform rotation angle position of the optical information recording medium. In the (a) of FIG. 10, a straight line of 0 degree represents a recording start position of each track.

The (b) of FIG. 10 is a schematic view of an embodiment of the bookcase. The bookcase 2 is constituted of, for example, a plurality of books 4 and a management domain 5. Recorded on the management domain is what is called management information including, for example, information regarding the optical information recording medium, information regarding an optical information recording and reproduction device which performed recording or reproduction, various setting conditions for recording and reproduction, environment information such as temperature, humidity, and date and time at the time of recording or reproduction, information regarding a physical address or a logical address, information on a medium format, information on a defect position, and information on an alternative domain. The management domain is not used for recording of user data. The management domain is arranged, for example, at a right end portion on the outermost circumferential side inside the bookcase. At the time of reproduction operation, the management domain is searched and reproduced first, for example.

A description is given of a method for searching for the management domain. Since the management domain is recorded on the end portion of the bookcase as described before, a boundary between a recorded area and an unrecorded area may be searched.

Figure 11B:
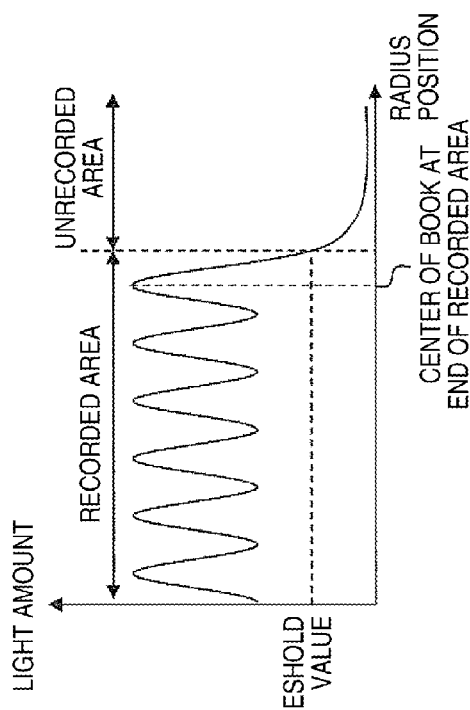
FIGS. 11A-11C are a schematic view illustrating an example of the relationship between recorded and unrecorded areas and the amount of light detected during scanning.
Figure 11C:
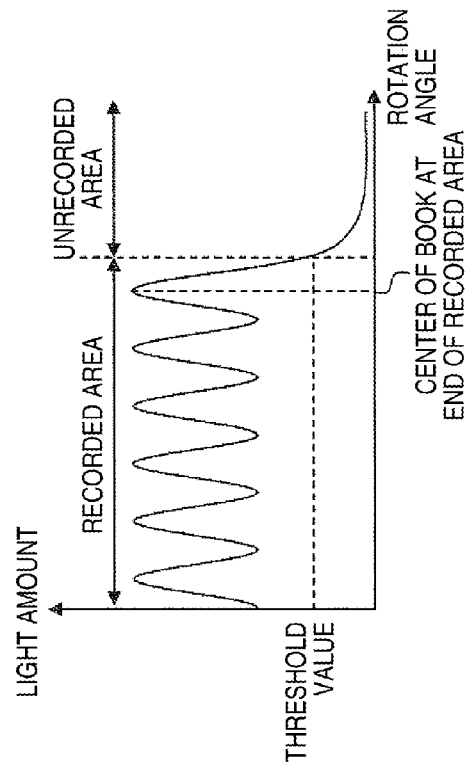
Figure 11A:
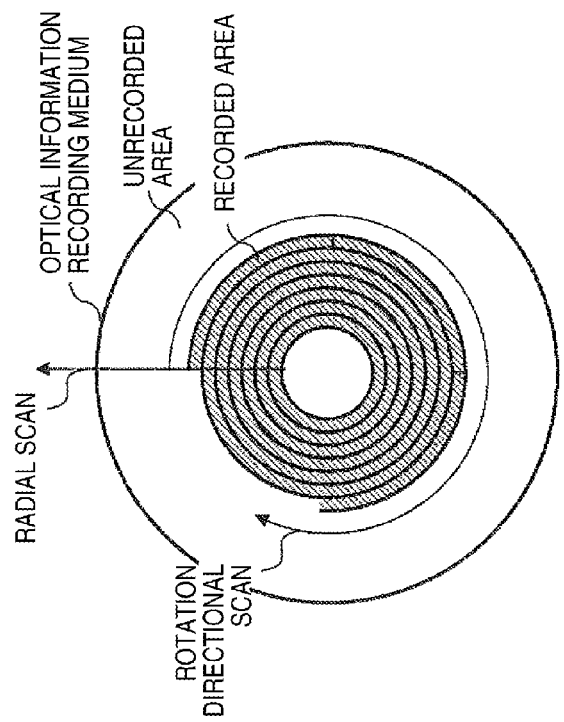

FIG. 11 is a schematic view illustrating an example of the relationship between recorded and unrecorded areas and the amount of light detected during scanning.

The (a) of FIG. 11 illustrates a recorded area and an unrecorded area in the optical information recording medium. Assume that the recorded area is concentrically positioned from the inner circumference toward the outer circumference of the optical information recording medium, and recording of the outermost circumference of the recorded area is completed in the middle of a rotation angle.

The (b) of FIG. 11 illustrates the light amount obtained when a reference light angle is shifted in a direction perpendicular to the direction of angle multiplexing and then the light amount is scanned in a radial direction to determine the outermost circumference of the recorded area. While the recorded area is being scanned, the light amount larger than a threshold is constantly detected, and a peak of the light amount is obtained whenever each book is scanned. Once scanning of the outermost circumference of the recorded area is ended, the light amount decreases to the level of the threshold or lower. Accordingly, this decrease in the light amount is detected, and the position of the last peak of the light amount is determined to be the outermost circumference of the recorded area.

The (c) of FIG. 11 illustrates the light amount obtained when the light amount is scanned in a rotation direction to determine the end of the recorded area. While the recorded area is being scanned, the light amount larger than a threshold is constantly detected, and a peak of the light amount is obtained whenever each book is scanned. Once scanning of the outermost circumference of the recorded area is ended, the light amount decreases to the level of the threshold or lower. Accordingly, this decrease in the light amount is detected, and the position of the last peak of the light amount is determined to be the end of the recorded area.

According to the above description, when the amount of light is scanned with the reference light angle being shifted in the direction perpendicular to the angle multiplexing direction, a boundary between the recorded area and the unrecorded area can stably be detected, and thereby a search for the management domain becomes possible.

Figure 12:
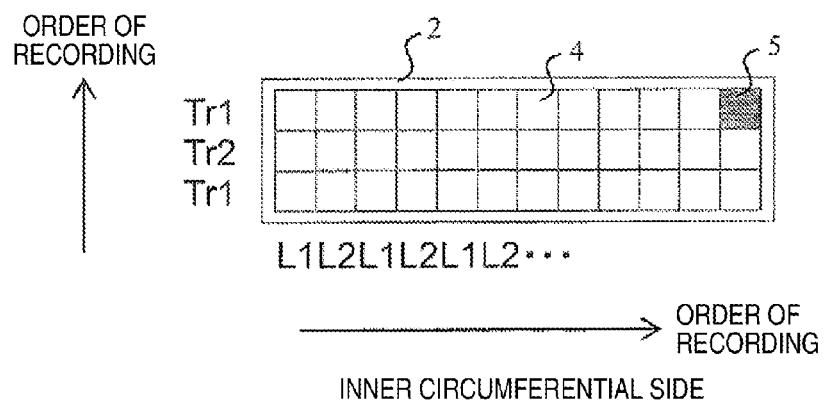
FIG. 12 is a schematic view illustrating an example of a recording order of books in the bookcase in the optical information recording and reproduction device.

FIG. 12 is a schematic view illustrating an example of a recording order of books in the bookcase in the optical information recording and reproduction device. For example, at the time of recording of the books, recording is performed in each track designated by Tr1 or Tr2. Once recording in one track is finished, recording operation proceeds to the next track where recording is performed. For example, recording in an odd-numbered track designated by Tr1 is first performed, and then recording of an even-numbered track designated by Tr2 is performed.

This is because the recorded area tends to be contracted by recording due to the property of the material of the optical information recording medium, and therefore such a recording method is performed to level the contracted states of adjacent tracks. That is, by recording in Tr1 first and then in Tr2, recording in Tr1 can be performed while both the adjacent tracks on the inner circumferential side and the outer circumferential side are in an uncontracted state, whereas recording in Tr2 can be performed while both the adjacent tracks on the inner circumferential side and the outer circumferential side are in a contracted state. This technique is called, for example, skip sorting.

Because of the same reason, recording of books on one track is performed in such a manner that a book designated by L1 is recorded and then a book designated by L2 is recorded. For example, the book L1 is called a layer 1, and the book L2 is called a layer 2. This technique is called, for example, layer recording.

Figure 13A:
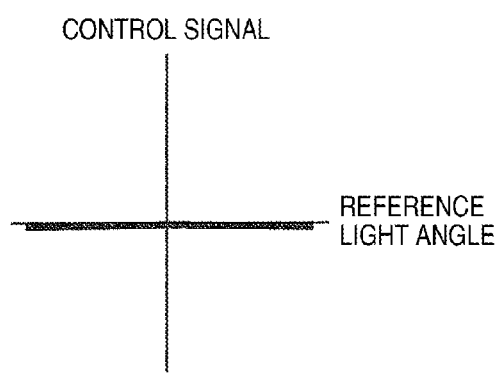
FIGS. 13A and 13B are a schematic view illustrating examples of a reference light angle control signal in the optical information recording and reproduction device.
Figure 13B:
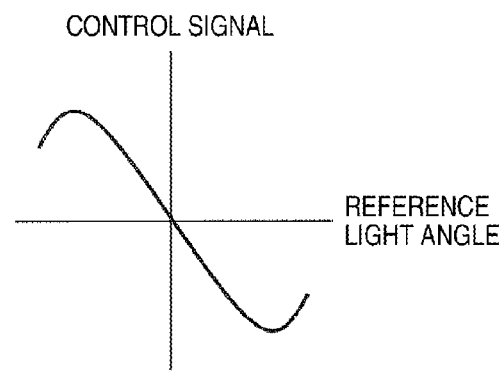

FIG. 13 is a schematic view illustrating an example of a reference light angle control signal in the optical information recording and reproduction device 10.

When the shielding filter 327 for shielding the reference light reflected from the surface of the disk is not provided in FIG. 2 or 3, the reflected light reflected from the surface of the disk is incident on the light detectors that detect signals of s polarization and p polarization. This may cause signal saturation in each of the light detectors 330 and 331. In this case, as illustrated in the (a) of FIG. 13, the control signal remains unchanged regardless of change in the reference light angle. As a result, it cannot be used as a control signal of the reference light angle.

When the shielding filter 327 for shielding the reference light reflected from the surface of the disk is provided, the surface-reflected light can be eliminated by the shielding filter 327. Accordingly, a control signal as illustrated in the (b) of FIG. 13 can be acquired.

FIG. 14 is a schematic view illustrating an embodiment of the shielding filter 327 in the pickup in the optical information recording and reproduction device 10. For example, the shielding filter 327 is arranged at a position where the reference light reflected from the surface of the disk is collected with the lens 326. The collection position of the reference light reflected from the surface of the disk moves in accordance with the reference light angle.

In this case, the size and position of the shielding filter 327 are determined to enable the light to be shielded at all the reference light angles used for recording and reproduction, for example. The size of the shielding filter may be designed in consideration of inclination tolerance of the disk and the attachment tolerance of the shielding filter. Designing the size in consideration of the tolerance makes it possible to implement a system that is resistant to inclination of the disk or resistant to installation error and the like due to the designed position of the shielding filter.

FIG. 15 illustrates an embodiment of a reference light angle setting flow at the time of reproduction in the optical information recording and reproduction device 10.

First, a servo control signal for the first page is detected in 1501. For example, the first page is determined in the case where the first servo control signal is obtained when the galvanomirror is gradually changed from a state at which the reference light angle is minimum toward a larger angle.

Then, the reference light angle is controlled to align with a zero crossing point of the control signal in 1502 so as to reproduce the target page. In this case, a mirror for phase conjugation reproduction is set to have an angle that is an average of the angles of s polarization and p polarization.

Next, it is determined whether or not the page is the last page in 1503. If the page is the last page, the processing is ended. If the page is not the last page, the processing shifts to a servo control signal of a next page in 1504, and the processing subsequent to 1502 is continued.

Whether or not the page is the last page may be determined based on, for example, a header in the reproduction page, or may also be determined based on, for example, loss of the servo control signal when it is desired to increase the reference light angle by a specified amount.

In the method of the present embodiment, it is not necessary to move the shielding filter 327, which offers advantages that the method can be implemented with a small parts count and that the system is simplified.

Hereinafter, embodiments different from the present embodiment will be described. In the following description, a description of the portions in common with the present embodiment will be omitted.

Second Embodiment

A second embodiment in the present invention will be described with reference to FIG. 16. Since a device can be implemented with the same configuration as the first embodiment, a description thereof will be omitted.

Figure 16:
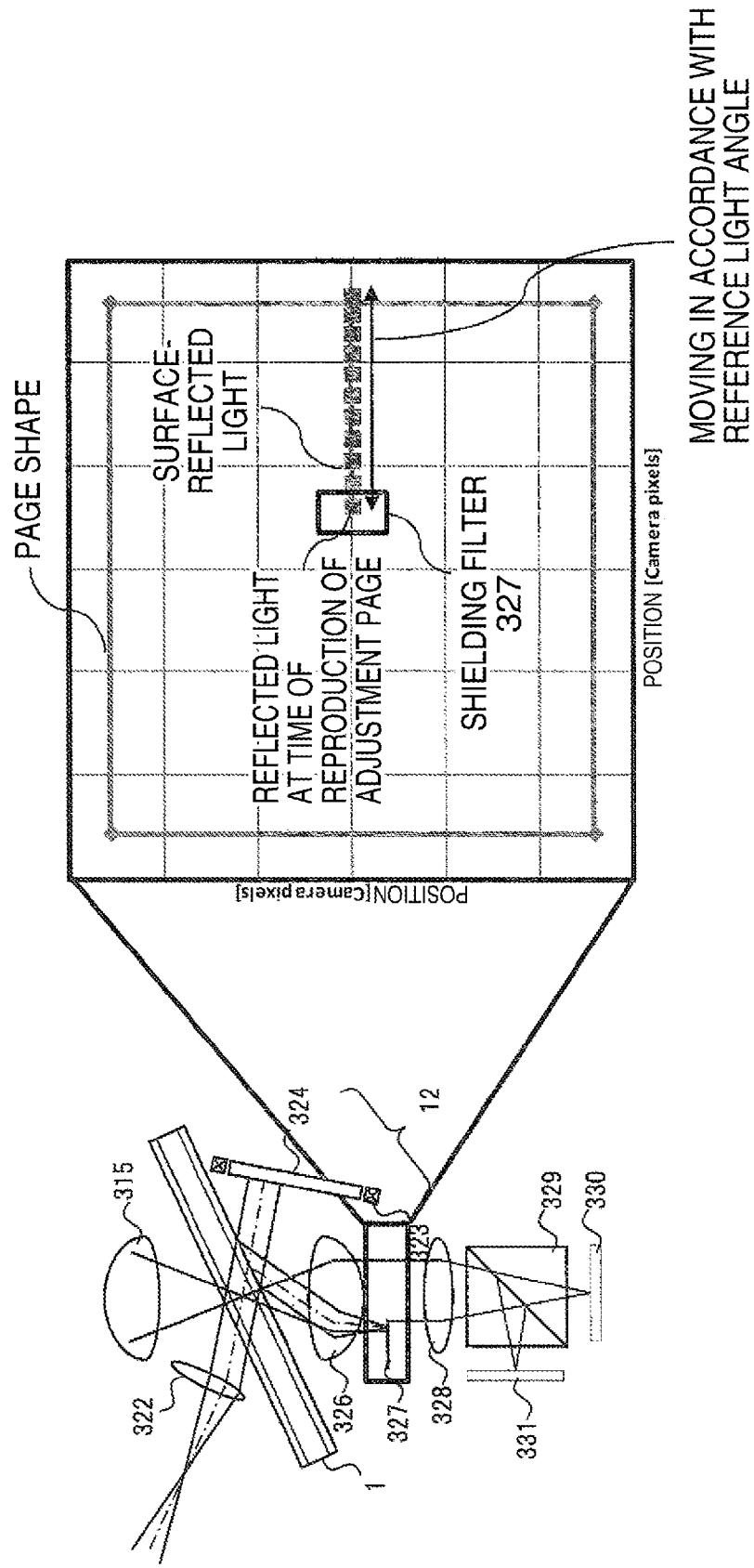
FIG. 16 is a schematic view illustrating an embodiment of the shielding filter in the pickup in the optical information recording and reproduction device.

FIG. 16 is a schematic view illustrating an embodiment of the shielding filter in the pickup in the optical information recording and reproduction device. FIG. 16 is different from FIG. 14 in the point that the size and position of the shielding filter 327 are set to be able to shield only the light reflected from the surface of the disk which corresponds to the reference light angle at the time of reproduction of an adjustment page, for example. Note that the adjustment page is a page provided to learn an optimal angle and position of the galvanomirror or the spatial filter, for example.

Although the case of one adjustment page is described in the present embodiment, a plurality of adjustment pages may be provided. In that case, the shielding filter 327 is designed to shield the light reflected from the surface of the disk which corresponds to reference light angles at the time of reproducing the respective adjustment pages. The size of the shielding filter may be designed in consideration of inclination tolerance of the disk and the attachment tolerance of the shielding filter.

In the configuration of the present embodiment, the shielding filter can be downsized more than that in the example illustrated in FIG. 14. Accordingly, the configuration of the present embodiment has an advantage that a decrease in the amount of reproduction light can be reduced.

Third Embodiment

A third embodiment in the present invention will be described with reference to FIG. 17. Since a device can be implemented with the same configuration as the first embodiment, a description thereof will be omitted.

Figure 17:
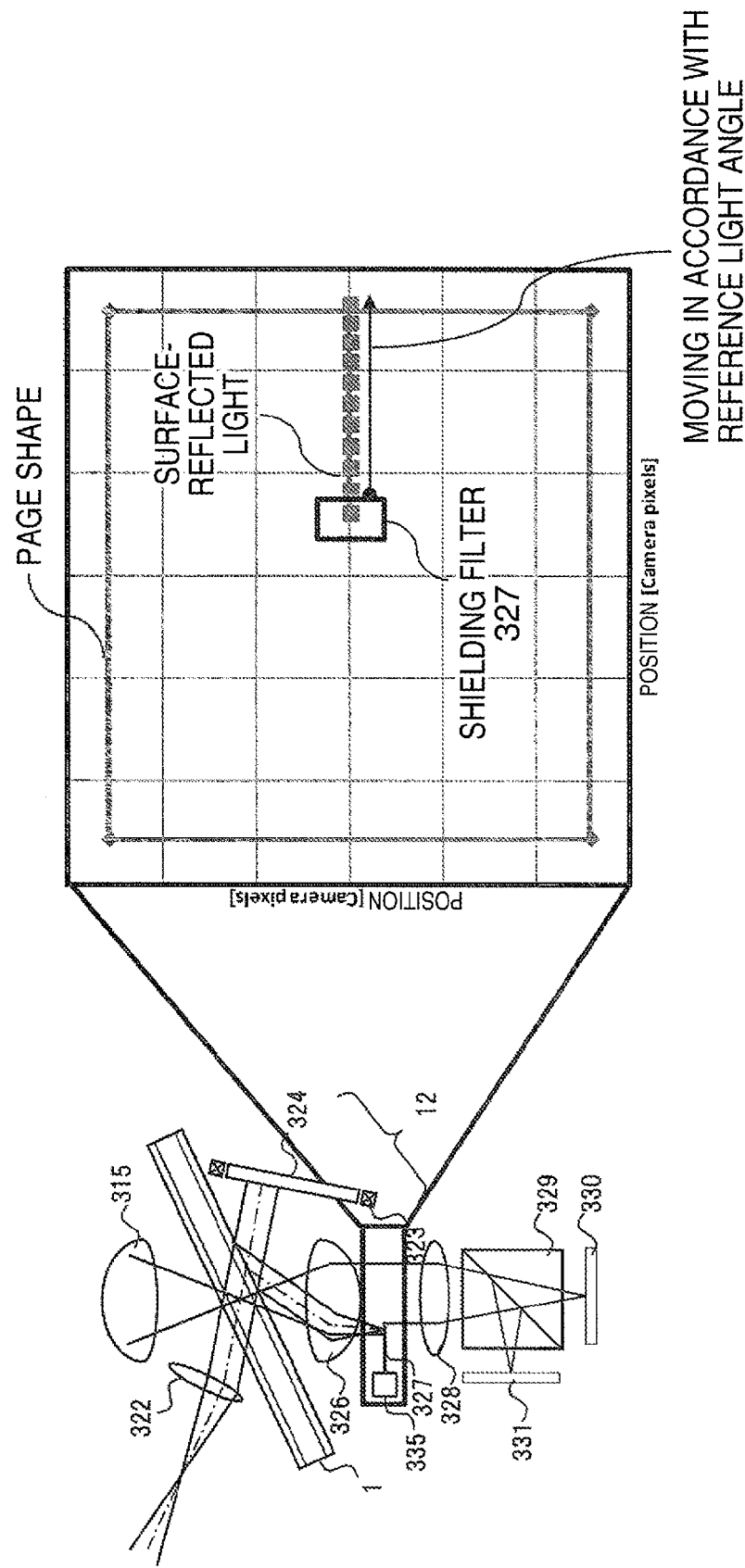
FIG. 17 is a schematic view illustrating an embodiment of the shielding filter in the pickup in the optical information recording and reproduction device.

FIG. 17 is a schematic view illustrating an embodiment of the shielding filter in the pickup in the optical information recording and reproduction device. The shielding filter in FIG. 17 successively moves in unison with the reference light angle or angular deviation of the optical information recording medium, for example. For movement of the shielding filter, an appropriate movement amount of the shielding filter may be determined in advance by learning and the like, for example, or a shielded amount of the light reflected from the surface of the disk is detected with a light detector, for example, to generate a position error signal of the shielding filter, so that the shielding filter is moved, for example, with an actuator 335.

In the case of the recording and reproduction device, the actuator 335 may be positioned at a position where pages are not shielded at the time of recording. The positions of the surface reflected-light on the page at the time of recording and at the time of reproduction do not necessarily coincide due to the influence of expansion and contraction of media or a wavelength shift. Accordingly, by adopting the configuration in which shielding is not performed at the time of recording, it becomes possible to prevent useless reduction in storage capacity.

In the configuration of the present embodiment, the shielding filter can be downsized more than that in the example illustrated in FIG. 14. Accordingly, the configuration of the present embodiment has an advantage that decrease in the amount of reproduction light can be reduced.

Fourth Embodiment

A fourth embodiment in the present invention will be described with reference to FIG. 18. Since a device can be implemented with the same configuration as the first embodiment, a description thereof will be omitted.

Figure 18:
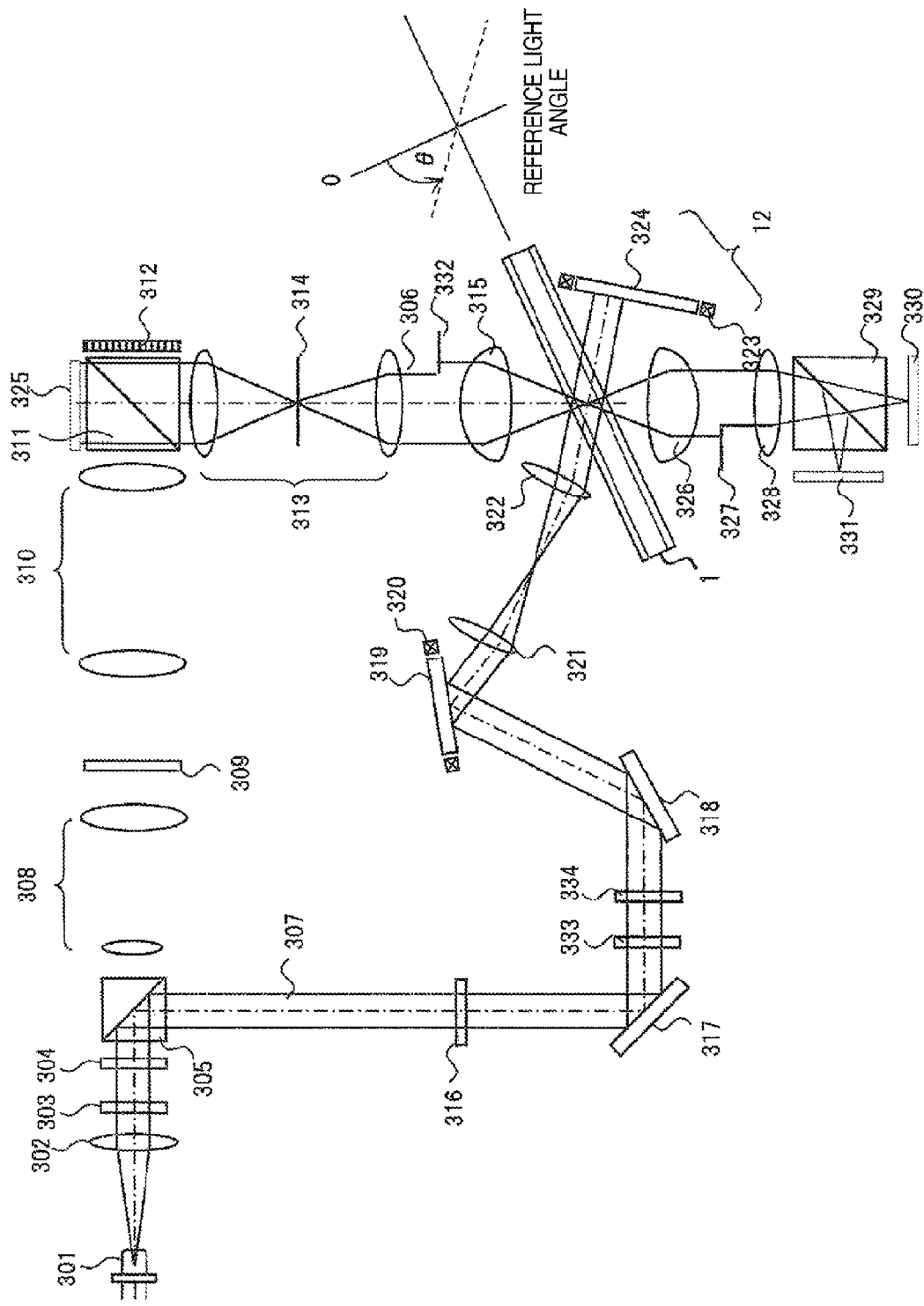
FIG. 18 is a schematic view illustrating an embodiment of the pickup in the optical information recording and reproduction device.

FIG. 18 is a schematic view illustrating an embodiment of the pickup in the optical information recording and reproduction device. FIG. 18 is different from FIG. 2 or 3 in the point that a shielding filter 332 is arranged between a lens 306 and a lens 315. In a method of the present embodiment, the reference light reflected from the surface of the disk and traveling upward from the disk 1 is shielded by the shielding filter 332. For example, the size and position of the shielding filter are designed by a method similar to the method illustrated in the first embodiment and the second embodiment.

In the method of the present embodiment, the reference light reflected from the surface of the disk, which is incident on the light detector 325 or the spatial light modulator 312, can be eliminated. Accordingly, the method has an advantage of being able to lengthen the lives of the light detector 325 and the spatial light modulator 312. Since the light detector 325 does not detect the light reflected on the surface of the disk, an advantage of being able to enhance signal quality of the reproduction signal is provided.

Fifth Embodiment

A fifth embodiment in the present invention will be described with reference to FIG. 19. Since a device can be implemented with the same configuration as the first embodiment, a description thereof will be omitted.

Figure 19:
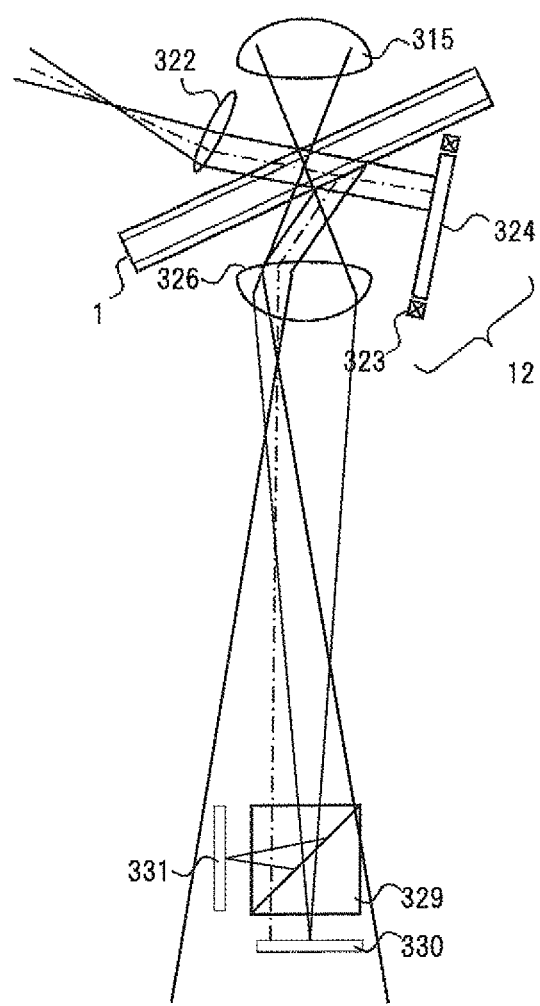
FIG. 19 is a schematic view illustrating an embodiment of part of the pickup in the optical information recording and reproduction device.

FIG. 19 is a schematic view illustrating an embodiment of part of the pickup in the optical information recording and reproduction device. Components not illustrated in the drawing are in common with those in FIG. 2 or 3. A reproduction signal from the disk 1 is made into convergence light by the lens 326, and is separated into s polarization and p polarization by the polarization beam splitter 329. The s polarization and p polarization are detected at collection positions by the light detector 330 and the light detector 331. In this case, while the reference light reflected from the surface of the disk is made into convergence light by the lens 326, a collection position thereof is placed ahead of the light detector 330 or the light detector 331 as illustrated in the drawing. As a result, energy density of the reference light reflected from the surface of the disk on the light detector 330 and the light detector 331 decreases to the level of the energy density of the detection signal or lower, for example, so that the influence thereof is reduced.

In the method of the present embodiment, the shielding filter is not arranged, which provides an advantage that the light amount of a weak reproduction signal from a hologram can be detected without causing reduction in the light amount.

It is to be understood that without being limited to the angle-multiplexing scheme, the present invention is applicable to other schemes (for example, a shift-multiplexing scheme and the like) in the viewpoint of shielding the reference light reflected from the surface of the disk.

It is to be understood that the present invention is not limited to the embodiments disclosed and various modified examples are included therein. For example, the above-disclosed embodiments have been described in detail for easy understanding of the present invention. The present invention, therefore, is not necessarily limited to those including all the configuration members described therein. It is also to be understood that part of the configuration in one embodiment may be replaced with the configuration of other embodiments, and the configuration of one embodiment may be added to the configuration of other embodiments.

Moreover, it is possible to delete and replace part of the configuration of each embodiment and to add other configurations thereto.

For example, provided as a first modification is an information reproduction device for reproducing from a recording medium information recorded on the recording medium by formation of a hologram, the device including: a light output unit configured to emit laser light; an optical system configured to generate reference light from the laser light emitted from the light output unit; an objective lens configured to receive reproduction signal light incident thereon, the reproduction signal light being reproduced by irradiation of the recording medium with the reference light; a light detector configured to receive the reproduction signal light propagated through the objective lens; a medium-reflected light reduction unit configured to reduce irradiation of the light detector with medium-reflected light generated by reflection of the reference light on the recording medium; and a control unit configured to control operation of the information reproduction device.

Provided as a second modification is an optical information recording and reproduction device for reproducing information from an optical information recording medium by using holography, the device including: a light output unit configured to emit laser light; an optical system configured to generate reference light from the laser emitted from the light output unit; a multiplexing angle adjustment unit configured to adjust an angle of the reference light in a multiplexing direction; an objective lens configured to make signal light reproduced from the optical information recording medium into substantially parallel light; an imaging unit configured to detect the signal light; and a reflected light reduction unit configured to reduce an influence of reflected light generated by irradiation of the optical information recording medium with the reference light.

Provided as a third modification is an information reproduction method for reproducing from a recording medium information recorded on the recording medium by formation of a hologram, the method including the steps of: emitting laser light; generating reference light from the laser light emitted from the light output unit; generating reproduction signal light by irradiation of the recording medium with the reference light; receiving the reproduction signal light; and reducing medium-reflected light generated by reflection of the reference light on the recording medium.

Provided as a fourth modification is an optical information recording and reproduction method for reproducing information from an optical information recording medium by using holography, the method including: a light output step of emitting laser light; a step of generating reference light from the laser emitted at the light output step; a multiplexing angle adjustment step of adjusting an angle of the reference light in a multiplexing direction; a step of making signal light reproduced from the optical information recording medium into substantially parallel light; an imaging step of detecting the signal light; and a reflected light reduction step of reducing an influence of reflected light generated by irradiation of the optical information recording medium with the reference light.

Each of the above-described configurations, functions, processing units, processing means and the like may be implemented in its entirety or in part in the form of hardware by such a way as designing them as an integrated circuit, for example. Moreover, each of the above-described configurations, functions and the like may be implemented in the form of software by a processor interpreting and executing programs which implement each of the functions. The programs for executing each of the functions and information such as tables and files may be placed in recording devices such as memory units, hard disks, and solid state drives (SSDs) or in recording media such as IC cards, SD cards, and DVDs.

Moreover, control lines and information lines represent only those considered to be necessary for description, and do not represent all the control lines and information lines necessary as a product. It may be considered that almost all the structural components are mutually connected in actuality.

REFERENCE SIGNS LIST

1 . . . Optical information recording medium
2 . . . Bookcase
3 . . . Track
4 . . . Book
5 . . . Management domain
10 . . . Optical information recording and reproduction device
11 . . . Pickup
12 . . . Optical system for reproduction reference light
13 . . . Cure optical system
14 . . . Optical system for detecting disk rotation angle
81 . . . Access control circuit
82 . . . Light source drive circuit
83 . . . Servo signal generation circuit
84 . . . Servo control circuit
85 . . . Signal processing circuit
86 . . . Signal generation circuit
87 . . . Shutter control circuit
88 . . . Disk rotation motor control circuit
89 . . . Controller
90 . . . I/O control circuit
91 . . . External control device
301 . . . Light source
302 . . . Collimator lens
303 . . . Shutter
304 . . . Half-wave plate
305 . . . Polarization beam splitter
306 . . . Signal light
307 . . . Reference light
308 . . . Beam expander
309 . . . Phase mask
310 . . . Relay lens
311 . . . PBS prism
312 . . . Spatial light modulator
313 . . . Relay lens
314 . . . Spatial filter
315 . . . Objective lens
316 . . . Polarization direction transducer
317 . . . Mirror
318 . . . Mirror
319 . . . Mirror
320 . . . Actuator
321 . . . Lens
322 . . . Lens
323 . . . Actuator
324 . . . Mirror
325 . . . Light detector
326 . . . Lens
327 . . . Shielding filter
328 . . . Lens
329 . . . PBS prism
330 . . . Light detector
331 . . . Light detector 332 . . . Shielding filter
333 . . . Wave plate
334 . . . Polarization separation element
335 . . . Actuator
401 . . . Light source
402 . . . Collimator lens
403 . . . Shutter
404 . . . Optical element
405 . . . PBS prism
406 . . . Signal light
407 . . . PBS prism
408 . . . Spatial light modulator
409 . . . Angle filter
410 . . . Objective lens
411 . . . Objective lens actuator
412 . . . Reference light
413 . . . Mirror
414 . . . Mirror
415 . . . Lens
416 . . . Galvanomirror
417 . . . Actuator
418 . . . Light detector
419 . . . Polarization direction transducer
420 . . . Driving direction
421 . . . Optical block

The invention claimed is:

1. An information reproduction device for reproducing from a recording medium information recorded on the recording medium by formation of a hologram, the device comprising:
a light output unit configured to emit laser light;
an optical system configured to generate reference light from the laser light emitted from the light output unit;
an objective lens configured to receive reproduction signal light incident thereon, the reproduction signal light being reproduced by irradiation of the recording medium with the reference light;
a light detector configured to receive the reproduction signal light propagated through the objective lens;
a medium-reflected light reduction unit configured to reduce irradiation of the light detector with medium-reflected light generated by reflection of the reference light on the recording medium;
a control unit configured to control operation of the information reproduction device;
a reference light angle adjustment unit configured to adjust an angle of incidence of the reference light on the recording medium, wherein when the reference light angle adjustment unit adjusts the angle of incidence of the reference light within a specified range, information is reproduced from a hologram multiplex-recorded on the recording medium;
a lens configured to receive the reproduction signal light incident thereon, the reproduction signal light being made into substantially parallel light by the objective lens, wherein the medium-reflected light reduction unit is arranged in an optical path between the objective lens and the lens; and
a moving unit configured to move a position of the medium-reflected light reduction unit, wherein
the moving unit moves the position of the medium-reflected light reduction unit based on a collection position of the medium-reflected light that changes depending on the angle of incidence of the reference light.

2. An information reproduction device for reproducing from a recording medium information recorded on the recording medium by formation of a hologram, the device comprising:
a light output unit configured to emit laser light;
an optical system configured to generate reference light from the laser light emitted from the light output unit;
an objective lens configured to receive reproduction signal light incident thereon, the reproduction signal light being reproduced by irradiation of the recording medium with the reference light;
a light detector configured to receive the reproduction signal light propagated through the objective lens;
a medium-reflected light reduction unit configured to reduce irradiation of the light detector with medium-reflected light generated by reflection of the reference light on the recording medium, wherein the medium-reflected light reduction unit is arranged at a position where a diameter of the medium-reflected light converged by the objective lens is substantially minimum and the reproduction signal light is substantially parallel light by the objective lens and a portion of the reproduction signal light is lost by the medium-reflected light reduction unit;
a control unit configured to control operation of the information reproduction device; and
a reference light angle adjustment unit configured to adjust an angle of incidence of the reference light on the recording medium, wherein when the reference light angle adjustment unit adjusts the angle of incidence of the reference light within a specified range, information is reproduced from a hologram multiplex-recorded on the recording medium.

3. The information reproduction device according to claim 2, wherein
a collection position of the medium-reflected light changes depending on the angle of incidence of the reference light, and
the medium-reflected light reduction unit is sized to shield the medium-reflected light collected on the collection position that changes depending on the angle of incidence of the reference light adjusted in the specified range.

4. The information reproduction device according to claim 1, wherein
the medium-reflected light reduction unit is sized to shield the medium-reflected light generated by incidence of the reference light at the angle of incidence.

5. The information reproduction device according to claim 1, wherein
the medium-reflected light reduction unit shields the medium-reflected light.

6. An information reproduction device for reproducing from a recording medium information recorded on the recording medium by formation of a hologram, the device comprising:
a light output unit configured to emit laser light;
an optical system configured to generate reference light from the laser light emitted from the light output unit;
an objective lens configured to receive reproduction signal light incident thereon, the reproduction signal light being reproduced by irradiation of the recording medium with the reference light;
a light detector configured to receive the reproduction signal light propagated through the objective lens;
a medium-reflected light reduction unit configured to reduce irradiation of the light detector with medium-reflected light generated by reflection of the reference light on the recording medium;

a control unit configured to control operation of the information reproduction device;

a reference light angle adjustment unit configured to adjust an angle of incidence of the reference light on the recording medium, wherein when the reference light angle adjustment unit adjusts the angle of incidence of the reference light within a specified range, information is reproduced from a hologram multiplex-recorded on the recording medium; and a lens configured to receive the reproduction signal light incident thereon, the reproduction signal light being made into substantially parallel light by the objective lens, wherein the medium-reflected light reduction unit is arranged in an optical path between the objective lens and the lens;

wherein the control unit calculates as an angle error signal an error from an optimum angle at a time of reproduction of the reference light, and the reference light angle adjustment unit adjusts the angle of incidence of the reference light based on the angle error signal.

7. The information reproduction device according to claim 1, wherein the medium-reflected light reduction unit reduces energy density of the medium-reflected light on the light detector to a level of the energy density of a detection signal or lower.

8. An information reproduction method for reproducing from a recording medium information recorded on the recording medium by formation of a hologram, the method comprising the steps of:

emitting laser light;

generating reference light from the laser light emitted from the light output unit;

generating reproduction signal light by irradiation of the recording medium with the reference light;

receiving the reproduction signal light;

reducing medium-reflected light generated by reflection of the reference light on the recording medium;

adjusting an angle of incidence of the reference light on the recording medium; and calculating as an angle error signal an error from an optimum angle at a time of reproduction of the reference light and adjusting the angle of incidence of the reference light based on the angle error signal;

wherein when the angle of incidence of the reference light is adjusted within a specified range in the step of adjusting the reference light angle, information is reproduced from a hologram multiplex-recorded on the recording medium.

9. The information reproduction method according to claim 8, wherein the step of reducing the medium-reflected light shields the medium-reflected light.

10. The information reproduction method according to claim 8, wherein the step of reducing the medium-reflected light reduces energy density of the medium-reflected light to a level of energy density of a detection signal or lower.

* * * * *